United States Patent
Gong et al.

(10) Patent No.: US 10,831,000 B2
(45) Date of Patent: Nov. 10, 2020

(54) OPTICAL LENS ASSEMBLY

(71) Applicant: GENIUS ELECTRONIC OPTICAL (XIAMEN) CO., LTD., Fujian (CN)

(72) Inventors: Jinhui Gong, Fujian (CN); Qingzhi Zhu, Fujian (CN); Jiali Lian, Fujian (CN)

(73) Assignee: GENIUS ELECTRONIC OPTICAL (XIAMEN) CO., LTD., Xiamen (CN)

(*) Notice: Subject to any disclaimer, the term of this patent is extended or adjusted under 35 U.S.C. 154(b) by 158 days.

(21) Appl. No.: 16/243,089

(22) Filed: Jan. 9, 2019

(65) Prior Publication Data

US 2020/0166731 A1    May 28, 2020

(30) Foreign Application Priority Data

Nov. 27, 2018 (CN) .......................... 2018 1 1425823

(51) Int. Cl.
  *G02B 13/00* (2006.01)
  *G02B 9/12* (2006.01)
  *G02B 9/34* (2006.01)

(52) U.S. Cl.
  CPC .............. *G02B 13/008* (2013.01); *G02B 9/12* (2013.01); *G02B 9/34* (2013.01); *G02B 13/004* (2013.01); *G02B 13/0035* (2013.01)

(58) Field of Classification Search
  CPC . G02B 13/00; G02B 9/12; G02B 9/34; G02B 13/0035; G02B 13/004; G02B 13/008; G01B 11/25; G03B 21/20
  See application file for complete search history.

(56) References Cited

U.S. PATENT DOCUMENTS

| | | | | |
|---|---|---|---|---|
| 3,191,488 A | * | 6/1965 | Eisner | G01J 3/14 356/300 |
| 8,643,957 B2 | * | 2/2014 | Chen | G02B 13/0045 359/713 |
| 9,316,810 B2 | * | 4/2016 | Mercado | G02B 13/002 |
| 2011/0157566 A1 | * | 6/2011 | Akiyama | G03B 21/20 353/102 |
| 2012/0293871 A1 | * | 11/2012 | Kubota | G02B 15/173 359/680 |
| 2015/0116569 A1 | * | 4/2015 | Mercado | H04N 5/2253 348/335 |
| 2015/0370039 A1 | * | 12/2015 | Bone | G02B 13/0035 359/715 |
| 2017/0068098 A1 | * | 3/2017 | Chern | G02B 27/0927 |
| 2017/0090154 A1 | * | 3/2017 | Hsieh | G02B 13/14 |

* cited by examiner

*Primary Examiner* — Balram T Parbadia
(74) *Attorney, Agent, or Firm* — JCIPRNET

(57) ABSTRACT

An optical lens assembly for generating light beams from near infrared light beams emitted by a structured light generating unit having light sources and passed through the optical lens assembly is provided. The optical lens assembly includes a first lens element, a second lens element and a third lens element arranged along an optical axis in a sequence from a light output side to a light input side. The optical lens assembly satisfies: SL/AAG≤6.500, wherein SL is a distance from an optical surface of one of an optical elements closest to the light output side of the optical lens assembly to the structured light generating unit having the plurality of light sources along the optical axis, and AAG is a sum of the air gaps among all lenses having refracting power of the optical lens assembly along the optical axis.

20 Claims, 37 Drawing Sheets

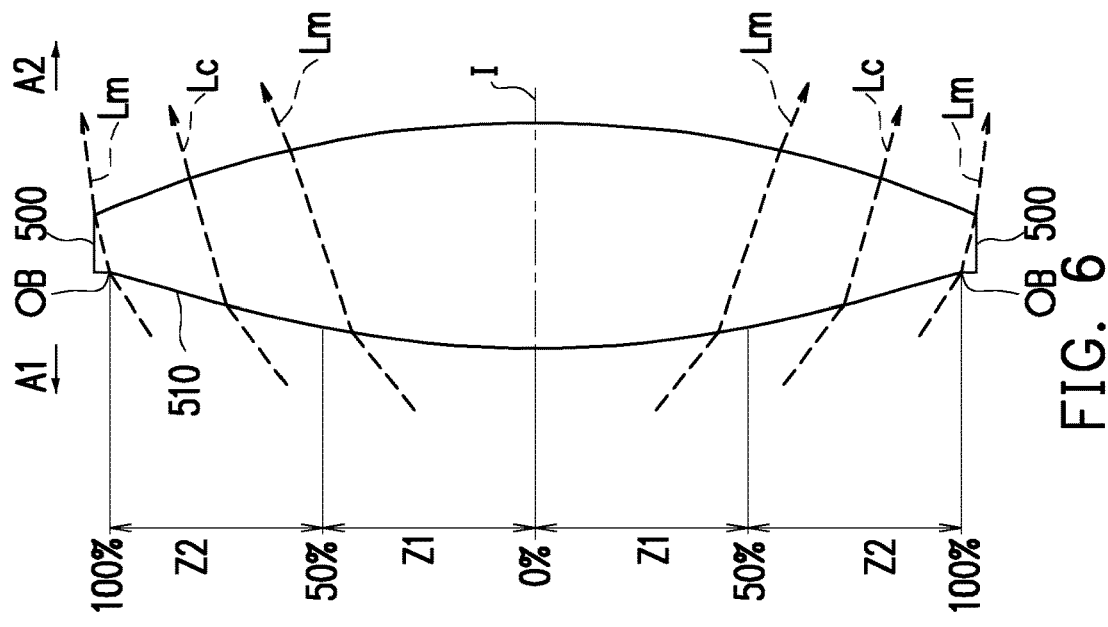
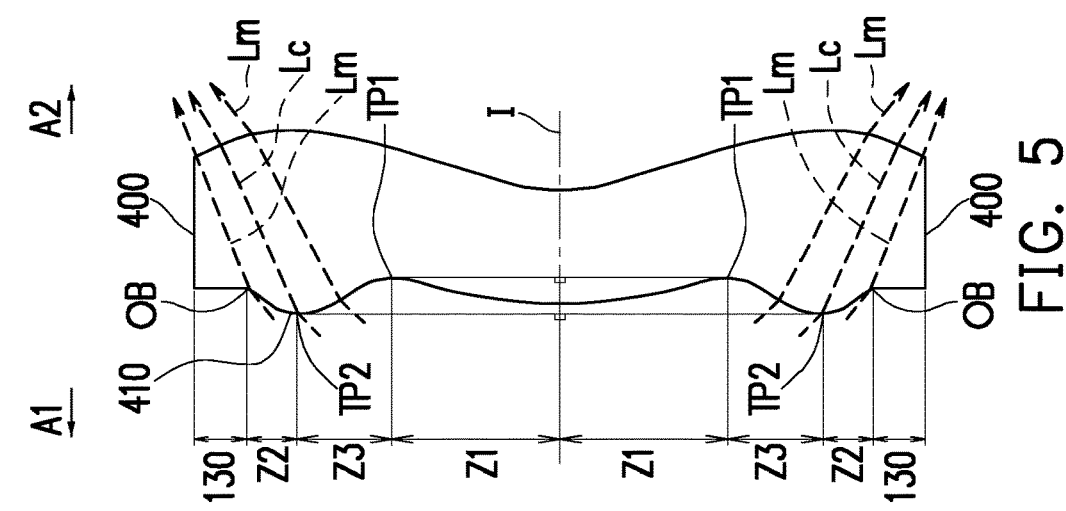
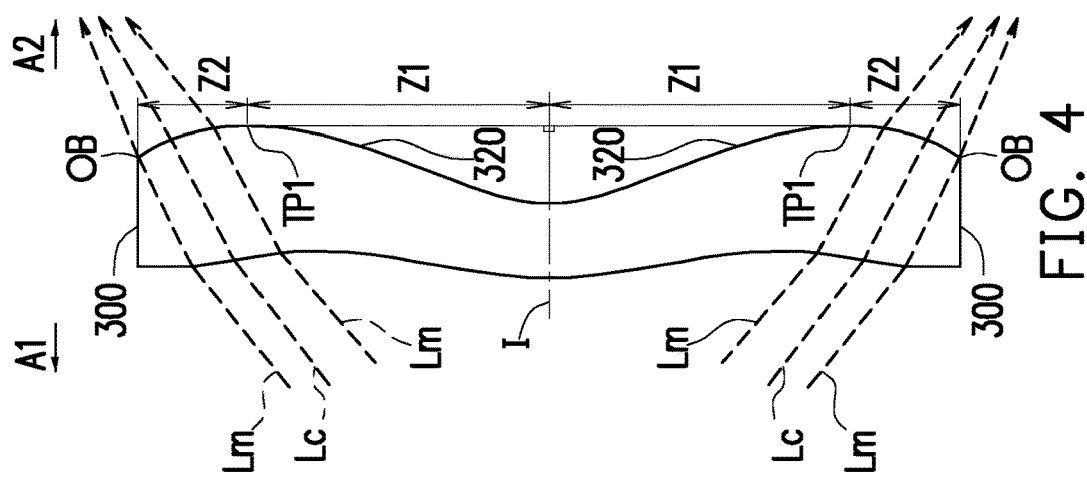

| First embodiment |||||||
|---|---|---|---|---|---|---|
| Effective focal length= 2.729 mm, SL=4.205mm, TTL=3.605 mm, Image height=0.450 mm, Half field of view=9.371°, F-number=2.155 |||||||
| Element | Surface | Radius (mm) | Thickness (mm) | Material | Refractive index | Abbe number | Focal length (mm) |
| Object | | Infinity | Infinity | | | | |
| filter 2 | Light output surface 25 | Infinity | 0.500 | | 1.458 | 67.821 | |
| | Light input surface 26 | Infinity | 0.000 | | | | |
| Aperture 1 | | Infinity | 0.100 | | | | |
| First lens element 4 | Light output surface 45 | 0.933 | 0.575 | Plastic | 1.545 | 55.987 | 1.964 |
| | Light input surface 46 | 6.475 | 0.613 | | | | |
| Second lens element 5 | Light output surface 55 | -0.443 | 0.610 | Plastic | 1.661 | 20.373 | 15.544 |
| | Light input surface 56 | -0.651 | 0.431 | | | | |
| Third lens element 6 | Light output surface 65 | -1.583 | 0.546 | Plastic | 1.545 | 55.987 | 5.390 |
| | Light input surface 66 | -1.145 | 0.830 | | | | |
| Structured light generating unit 15 | light emitting reference plane 100a | Infinity | | | | | |

FIG. 9

| Surface | K | $a_2$ | $a_4$ | $a_6$ |
|---|---|---|---|---|
| 45 | 0.000000E+00 | 0.000000E+00 | 7.291766E-03 | -1.217050E-02 |
| 46 | 0.000000E+00 | 0.000000E+00 | 1.197785E-02 | -2.250889E-01 |
| 55 | -8.750636E-01 | 0.000000E+00 | 3.869955E-01 | 2.721996E+00 |
| 56 | -9.511014E-01 | 0.000000E+00 | 6.663039E-01 | 3.994939E-01 |
| 65 | 0.000000E+00 | 0.000000E+00 | 8.005940E-01 | -1.811298E+00 |
| 66 | 0.000000E+00 | 0.000000E+00 | 4.766180E-02 | -2.154170E-01 |
| Surface | $a_8$ | $a_{10}$ | $a_{12}$ | |
| 45 | -5.972468E-02 | 2.513376E-01 | -9.715470E-01 | |
| 46 | 7.822475E-01 | -4.129303E+00 | 4.429135E+00 | |
| 55 | -8.993062E+00 | 9.636456E+00 | 1.009323E+01 | |
| 56 | 2.280507E-01 | -7.981978E-01 | 7.820262E+00 | |
| 65 | 2.033345E+00 | 3.772613E-02 | -9.347280E-01 | |
| 66 | 3.870100E-02 | 3.653900E-01 | -2.188950E-01 | |

FIG. 10

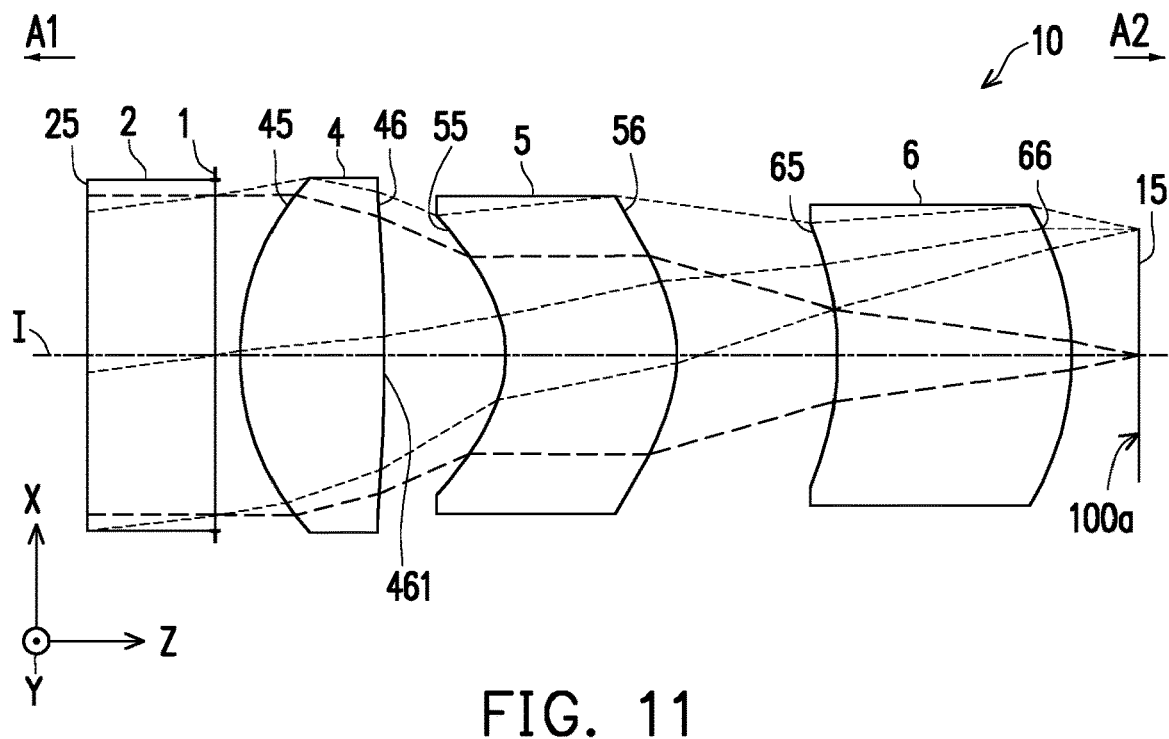
FIG. 11
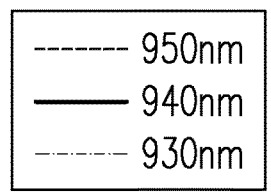
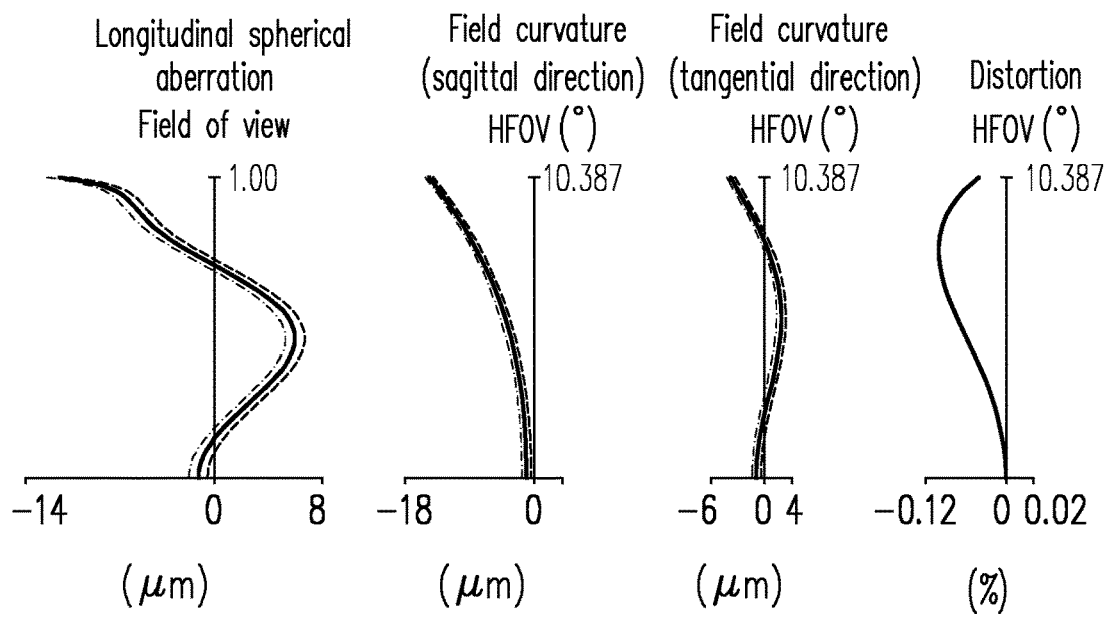
FIG. 12A   FIG. 12B   FIG. 12C   FIG. 12D

| Second embodiment |||||||
|---|---|---|---|---|---|---|
| Effective focal length= 2.729 mm, SL=4.092mm, TTL=3.492 mm, Image height=0.500 mm, Half field of view=10.387°, F-number=2.155 |||||||
| Element | Surface | Radius (mm) | Thickness (mm) | Material | Refractive index | Abbe number | Focal length (mm) |
| Object | | Infinity | Infinity | | | | |
| filter 2 | Light output surface 25 | Infinity | 0.500 | | 1.458 | 67.821 | |
| | Light input surface 26 | Infinity | 0.000 | | | | |
| Aperture 1 | | Infinity | 0.100 | | | | |
| First lens element 4 | Light output surface 45 | 1.090 | 0.557 | Plastic | 1.545 | 55.987 | 1.770 |
| | Light input surface 46 | -6.003 | 0.473 | | | | |
| Second lens element 5 | Light output surface 55 | -0.496 | 0.665 | Plastic | 1.545 | 55.987 | 5.672 |
| | Light input surface 56 | -0.626 | 0.626 | | | | |
| Third lens element 6 | Light output surface 65 | -1.167 | 0.910 | Plastic | 1.545 | 55.987 | 7.300 |
| | Light input surface 66 | -1.144 | 0.260 | | | | |
| Structured light generating unit 15 | light emitting reference plane 100a | Infinity | | | | | |

FIG. 13

| Surface | K | $a_2$ | $a_4$ | $a_6$ |
|---|---|---|---|---|
| 45 | 0.000000E+00 | 0.000000E+00 | 1.913085E-02 | 7.735062E-02 |
| 46 | 0.000000E+00 | 0.000000E+00 | 7.882102E-02 | -9.549063E-03 |
| 55 | -9.579740E-01 | 0.000000E+00 | 4.950858E-01 | 8.148316E-01 |
| 56 | -9.554619E-01 | 0.000000E+00 | 5.331675E-01 | -1.936400E-02 |
| 65 | 0.000000E+00 | 0.000000E+00 | 6.410150E-01 | -1.749967E+00 |
| 66 | 0.000000E+00 | 0.000000E+00 | 7.375450E-02 | -1.543080E-01 |
| Surface | $a_8$ | $a_{10}$ | $a_{12}$ | |
| 45 | 1.037386E-01 | -1.842977E-01 | 3.128939E-02 | |
| 46 | 5.937466E-01 | -2.133373E+00 | 1.191592E+00 | |
| 55 | -4.054713E+00 | 3.860211E+00 | -5.157159E-01 | |
| 56 | -9.413971E-02 | -2.216617E-01 | 2.582773E-01 | |
| 65 | 1.978445E+00 | -3.070825E+00 | -6.386457E-01 | |
| 66 | -5.704010E-02 | 1.667890E-01 | -1.046500E-01 | |

FIG. 14

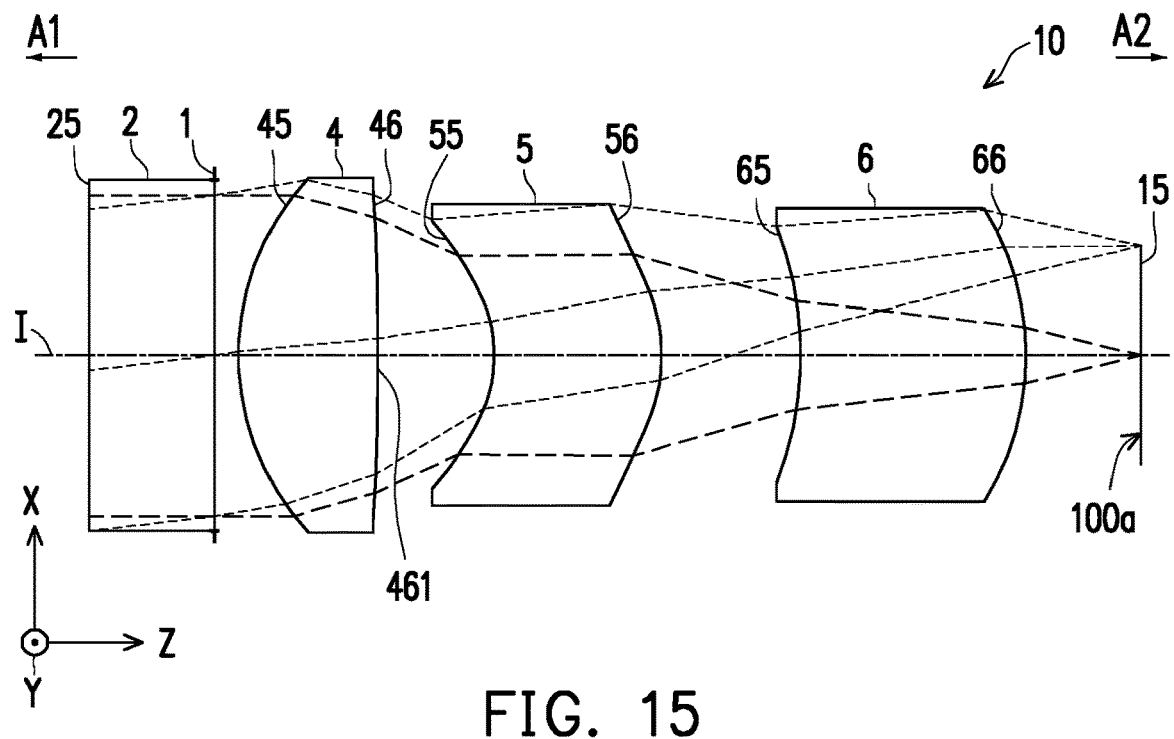
FIG. 15
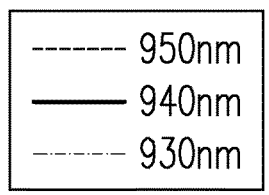
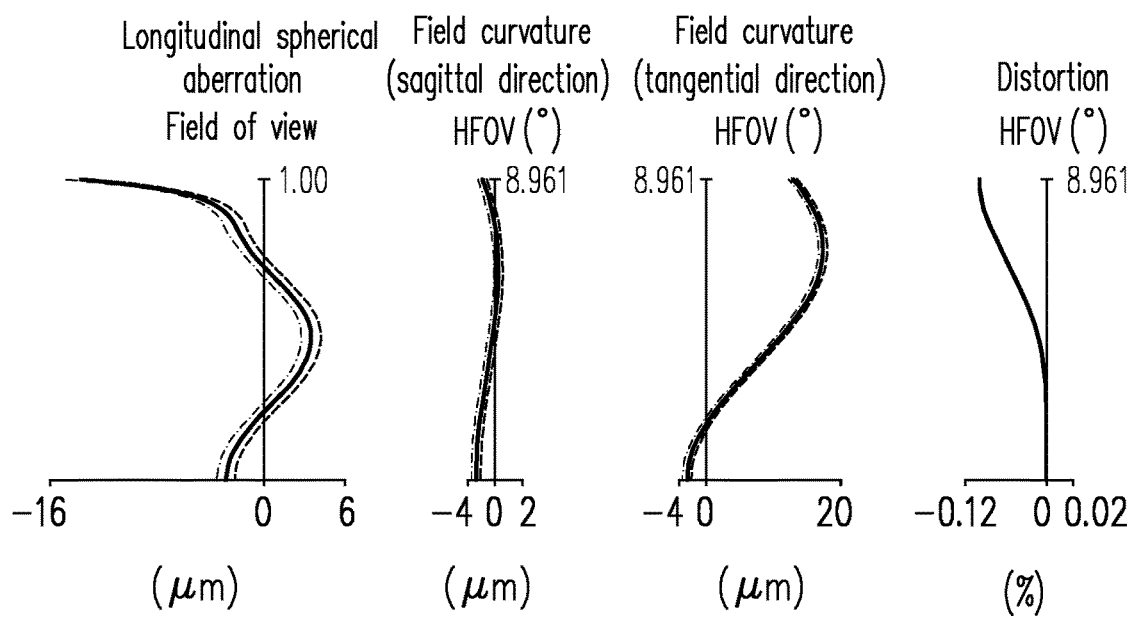
FIG. 16A    FIG. 16B    FIG. 16C    FIG. 16D

| Third embodiment ||||||||
|---|---|---|---|---|---|---|---|
| Effective focal length= 2.729 mm, SL=4.221mm, TTL=3.621 mm, ||||||||
| Image height=0.430 mm, Half field of view=8.961°, F-number=2.155 ||||||||
| Element | Surface | Radius (mm) | Thickness (mm) | Material | Refractive index | Abbe number | Focal length (mm) |
| Object | | Infinity | Infinity | | | | |
| filter 2 | Light output surface 25 | Infinity | 0.500 | | 1.458 | 67.821 | |
| | Light input surface 26 | Infinity | 0.000 | | | | |
| Aperture 1 | | Infinity | 0.100 | | | | |
| First lens element 4 | Light output surface 45 | 1.065 | 0.555 | Plastic | 1.545 | 55.987 | 1.831 |
| | Light input surface 46 | -10.097 | 0.472 | | | | |
| Second lens element 5 | Light output surface 55 | -0.497 | 0.670 | Plastic | 1.545 | 55.987 | 5.435 |
| | Light input surface 56 | -0.624 | 0.560 | | | | |
| Third lens element 6 | Light output surface 65 | -1.145 | 0.898 | Plastic | 1.545 | 55.987 | 7.714 |
| | Light input surface 66 | -1.142 | 0.466 | | | | |
| Structured light generating unit 15 | light emitting reference plane 100a | Infinity | | | | | |

FIG. 17

| Surface | K | $a_2$ | $a_4$ | $a_6$ |
|---|---|---|---|---|
| 45 | 0.000000E+00 | 0.000000E+00 | 2.695398E-02 | 5.374334E-02 |
| 46 | 0.000000E+00 | 0.000000E+00 | 4.553729E-02 | -7.069548E-02 |
| 55 | -9.054874E-01 | 0.000000E+00 | 4.240742E-01 | 1.125656E+00 |
| 56 | -9.517378E-01 | 0.000000E+00 | 6.031886E-01 | -2.764632E-01 |
| 65 | 0.000000E+00 | 0.000000E+00 | 6.186718E-01 | -1.607679E+00 |
| Surface | $a_8$ | $a_{10}$ | $a_{12}$ | |
| 45 | 4.807861E-02 | -1.640991E-01 | 5.414718E-02 | |
| 46 | 5.603965E-01 | -2.209227E+00 | 1.705384E+00 | |
| 55 | -3.522502E+00 | 4.842939E+00 | -4.344374E+00 | |
| 56 | 6.071054E-01 | 1.520460E+00 | -2.802379E+00 | |
| 65 | 2.387603E+00 | -2.847533E+00 | 9.481582E-01 | |

FIG. 18

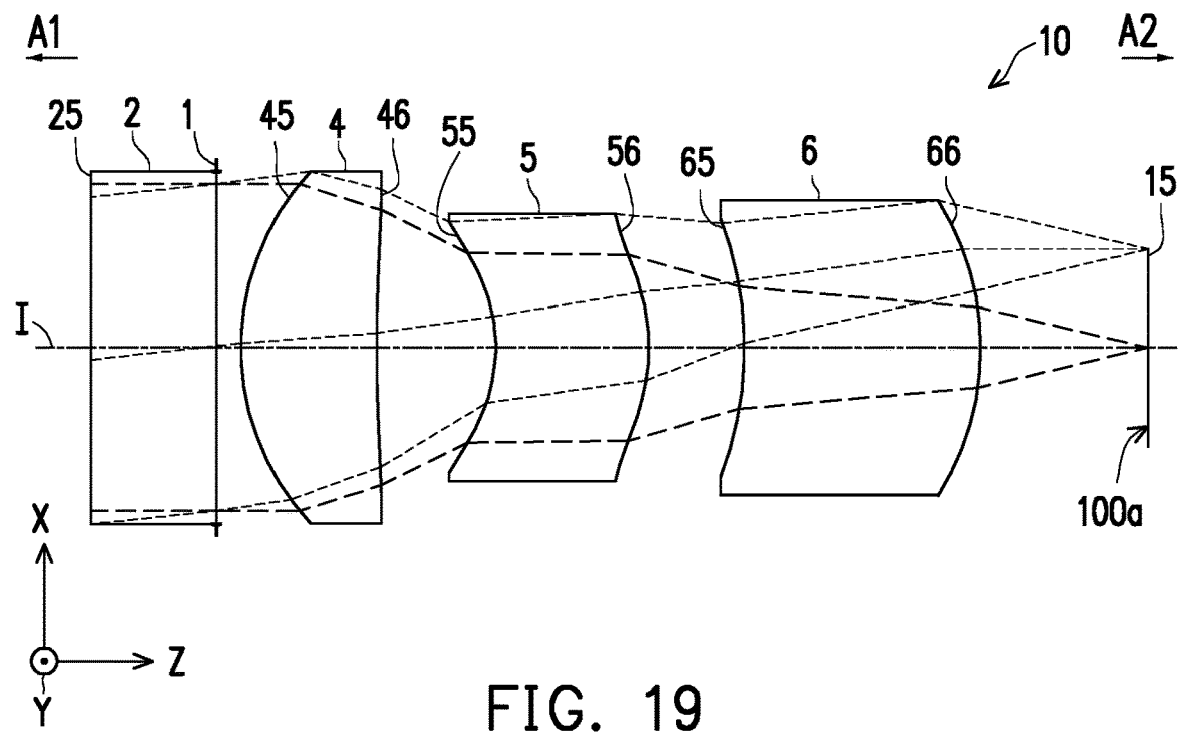
FIG. 19
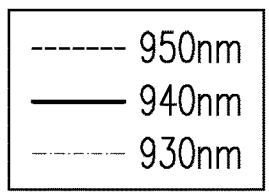
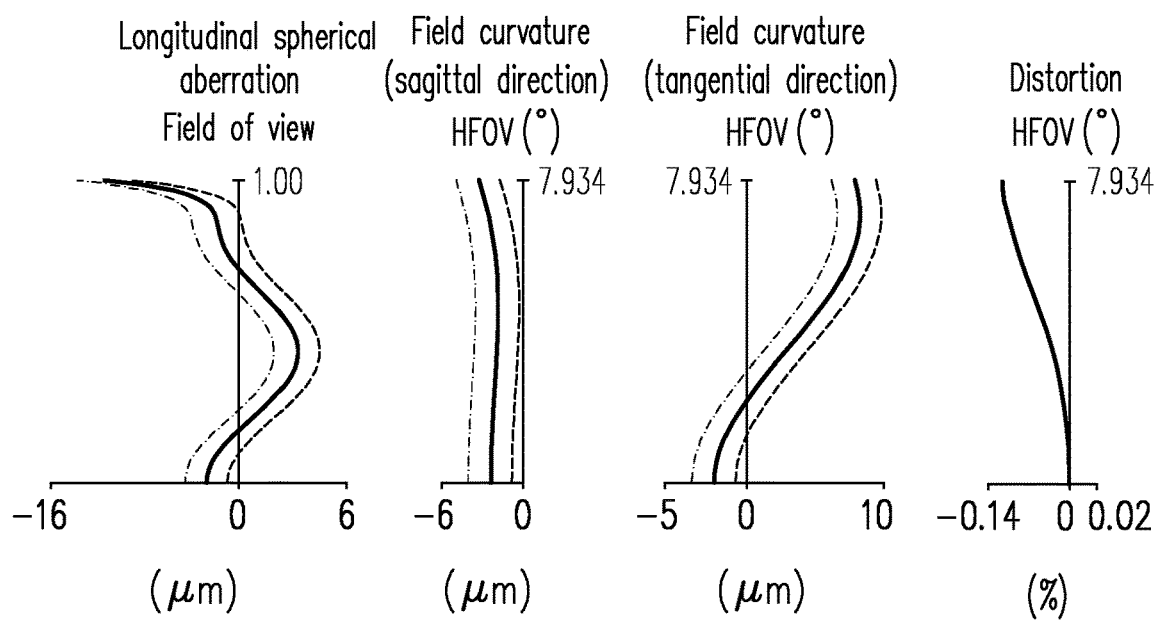
FIG. 20A   FIG. 20B   FIG. 20C   FIG. 20D

| Fourth embodiment | | | | | | | |
|---|---|---|---|---|---|---|---|
| Effective focal length= 2.729 mm, SL=4.199mm, TTL=3.599 mm, Image height=0.380 mm, Half field of view=7.934°, F-number=2.155 | | | | | | | |
| Element | Surface | Radius (mm) | Thickness (mm) | Material | Refractive index | Abbe number | Focal length (mm) |
| Object | | Infinity | Infinity | | | | |
| filter 2 | Light output surface 25 | Infinity | 0.500 | | 1.458 | 67.821 | |
| | Light input surface 26 | Infinity | 0.000 | | | | |
| Aperture 1 | | Infinity | 0.100 | | | | |
| First lens element 4 | Light output surface 45 | 1.015 | 0.538 | Plastic | 1.661 | 20.373 | 1.764 |
| | Light input surface 46 | 8.590 | 0.473 | | | | |
| Second lens element 5 | Light output surface 55 | -0.545 | 0.605 | Plastic | 1.661 | 20.373 | 8.231 |
| | Light input surface 56 | -0.706 | 0.386 | | | | |
| Third lens element 6 | Light output surface 65 | -1.096 | 0.928 | Plastic | 1.661 | 20.373 | 5.451 |
| | Light input surface 66 | -1.106 | 0.669 | | | | |
| Structured light generating unit 15 | light emitting reference plane 100a | Infinity | | | | | |

FIG. 21

| Surface | K | $a_2$ | $a_4$ | $a_6$ |
|---|---|---|---|---|
| 45 | 0.000000E+00 | 0.000000E+00 | 1.878306E-02 | 5.867905E-02 |
| 46 | 0.000000E+00 | 0.000000E+00 | 3.074290E-02 | -2.025344E-01 |
| 55 | -9.106086E-01 | 0.000000E+00 | 4.569444E-01 | 1.412899E+00 |
| 56 | -9.504056E-01 | 0.000000E+00 | 7.297530E-01 | -3.510509E-02 |
| 65 | 0.000000E+00 | 0.000000E+00 | 5.398466E-01 | -1.492432E+00 |
| Surface | $a_8$ | $a_{10}$ | $a_{12}$ | |
| 45 | -1.274317E-01 | 3.032457E-01 | -5.411547E-01 | |
| 46 | 1.036769E+00 | -3.930918E+00 | 3.608760E+00 | |
| 55 | -5.024415E+00 | 5.315020E+00 | -3.541863E-01 | |
| 56 | 1.390600E+00 | -9.176944E-01 | 2.977247E+00 | |
| 65 | 2.393107E+00 | -2.821471E+00 | 5.617244E-01 | |

FIG. 22

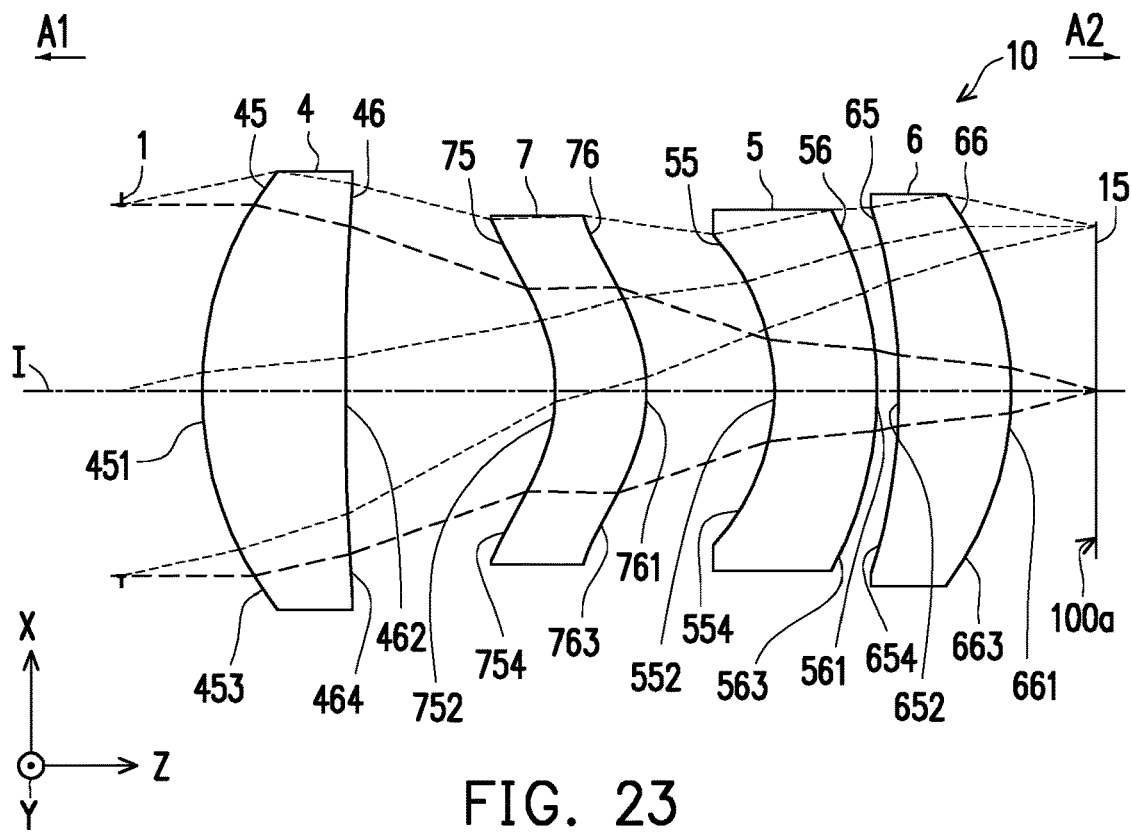
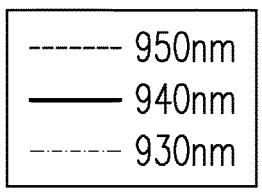
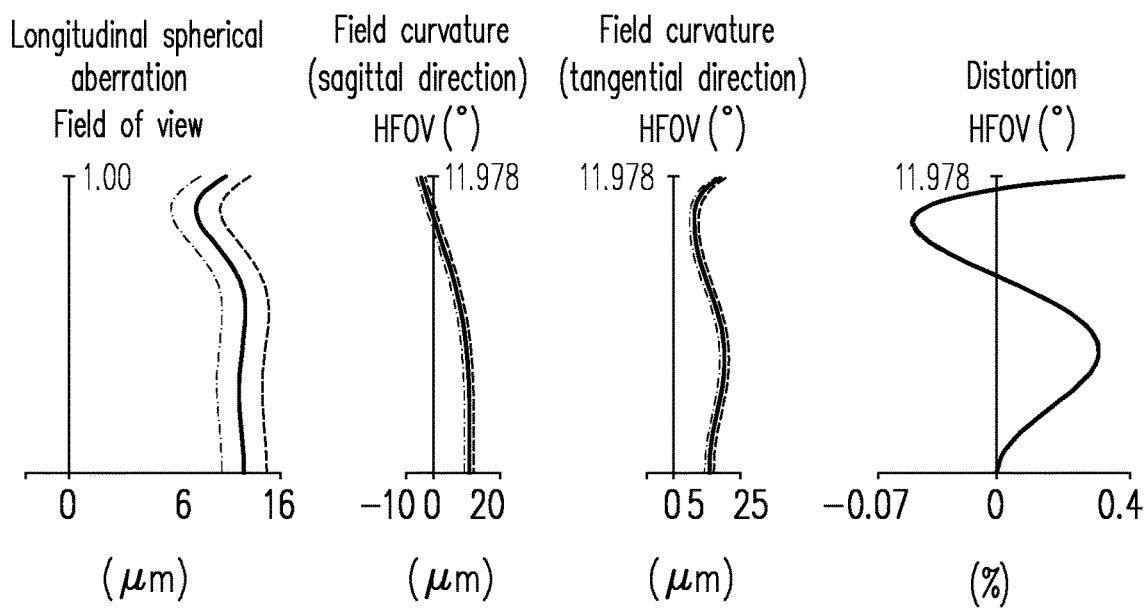
FIG. 24A  FIG. 24B  FIG. 24C  FIG. 24D

| Fifth embodiment |||||||
|---|---|---|---|---|---|---|
| Effective focal length= 2.899 mm, SL=3.659mm, TTL=3.358 mm, |||||||
| Image height=0.250 mm, Half field of view=4.930°, F-number=2.096 |||||||
| Element | Surface | Radius (mm) | Thickness (mm) | Material | Refractive index | Abbe number | Focal length (mm) |
| Object | | Infinity | Infinity | | | | |
| Aperture 1 | | Infinity | 0.301 | | | | |
| First lens element 4 | Light output surface 45 | 1.283 | 0.540 | Plastic | 1.661 | 20.374 | 2.200 |
| | Light input surface 46 | 13.118 | 0.788 | | | | |
| Fourth lens element 7 | Light output surface 75 | -0.598 | 0.341 | Plastic | 1.661 | 20.374 | 4.434 |
| | Light input surface 76 | -0.602 | 0.482 | | | | |
| Second lens element 5 | Light output surface 55 | -0.747 | 0.386 | Plastic | 1.661 | 20.374 | -3.683 |
| | Light input surface 56 | -1.318 | 0.079 | | | | |
| Third lens element 6 | Light output surface 65 | -2.316 | 0.424 | Plastic | 1.661 | 20.374 | 3.430 |
| | Light input surface 66 | -1.202 | 0.318 | | | | |
| Structured light generating unit 15 | light emitting reference plane 100a | Infinity | | | | | |

FIG. 25

| Surface | K | $a_2$ | $a_4$ | $a_6$ |
|---|---|---|---|---|
| 45 | 0.000000E+00 | 0.000000E+00 | -7.041778E-03 | -5.236520E-02 |
| 46 | 0.000000E+00 | 0.000000E+00 | 6.658770E-03 | -9.851419E-02 |
| 75 | -1.201388E+00 | 0.000000E+00 | 1.776757E-01 | 1.467562E+00 |
| 76 | -1.531656E+00 | 0.000000E+00 | 1.868046E-01 | 5.260152E-01 |
| 55 | 0.000000E+00 | 0.000000E+00 | 6.483655E-01 | -5.978430E-01 |
| 56 | 0.000000E+00 | 0.000000E+00 | 9.422453E-02 | -1.104382E-01 |
| Surface | $a_8$ | $a_{10}$ | $a_{12}$ | |
| 45 | 1.014357E-01 | -6.358754E-03 | -9.460539E-02 | |
| 46 | 4.098824E-01 | -4.116955E-01 | 9.552262E-05 | |
| 75 | -2.025162E+00 | 1.244577E+00 | -1.433692E+00 | |
| 76 | -6.596823E-02 | 0.000000E+00 | 0.000000E+00 | |
| 55 | -3.409482E+00 | -1.619374E+00 | 3.029122E+01 | |
| 56 | -3.332255E-01 | -9.241331E-01 | 3.754248E+00 | |

FIG. 26

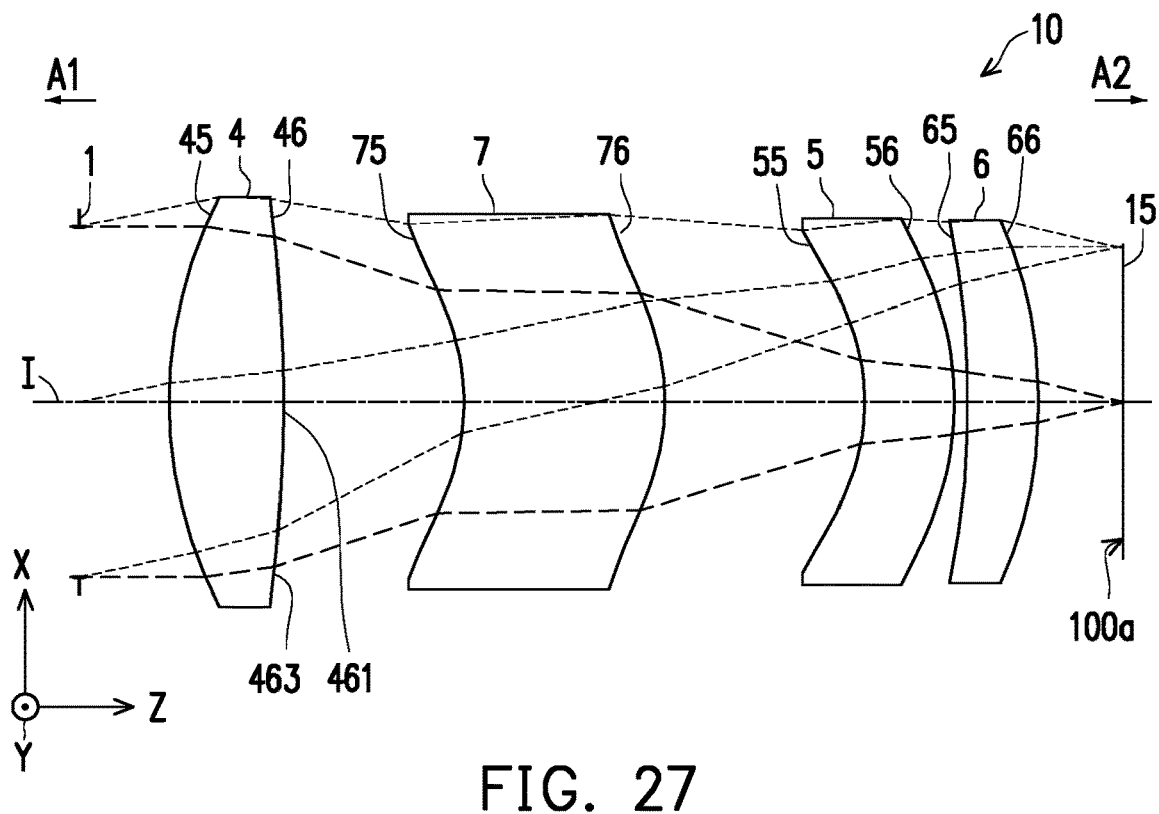
FIG. 27
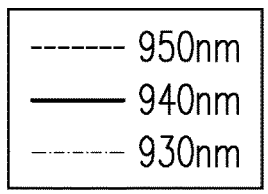
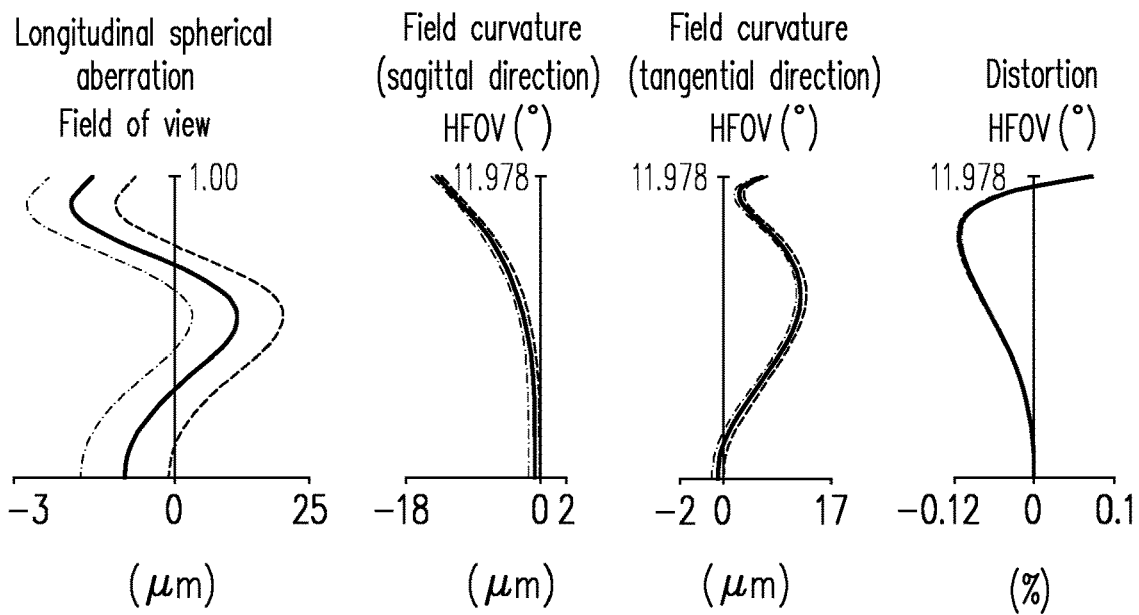
FIG. 28A   FIG. 28B   FIG. 28C   FIG. 28D

| Sixth embodiment | | | | | | | |
|---|---|---|---|---|---|---|---|
| Effective focal length= 2.899 mm, SL=4.111mm, TTL=3.757 mm, | | | | | | | |
| Image height=0.260 mm, Half field of view=5.130°, F-number=2.096 | | | | | | | |
| Element | Surface | Radius (mm) | Thickness (mm) | Material | Refractive index | Abbe number | Focal length (mm) |
| Object | | Infinity | Infinity | | | | |
| Aperture 1 | | Infinity | 0.354 | | | | |
| First lens element 4 | Light output surface 45 | 1.618 | 0.449 | Glass | 1.623 | 58.154 | 2.212 |
| | Light input surface 46 | -7.425 | 0.712 | | | | |
| Fourth lens element 7 | Light output surface 75 | -0.846 | 0.792 | Plastic | 1.661 | 20.374 | 4.523 |
| | Light input surface 76 | -0.891 | 0.788 | | | | |
| Second lens element 5 | Light output surface 55 | -0.775 | 0.354 | Plastic | 1.661 | 20.374 | -6.144 |
| | Light input surface 56 | -1.139 | 0.050 | | | | |
| Third lens element 6 | Light output surface 65 | -3.642 | 0.281 | Plastic | 1.661 | 20.374 | 5.197 |
| | Light input surface 66 | -1.783 | 0.332 | | | | |
| Structured light generating unit 15 | light emitting reference plane 100a | Infinity | | | | | |

FIG. 29

| Surface | K | $a_2$ | $a_4$ | $a_6$ |
|---|---|---|---|---|
| 45 | 0.000000E+00 | 0.000000E+00 | -2.696907E-02 | -7.923009E-02 |
| 46 | 0.000000E+00 | 0.000000E+00 | -3.022258E-02 | -8.964278E-02 |
| 75 | -1.048011E+00 | 0.000000E+00 | 9.803262E-02 | 7.972917E-01 |
| 76 | -1.451012E+00 | 0.000000E+00 | 1.339954E-01 | 1.833907E-01 |
| 55 | 0.000000E+00 | 0.000000E+00 | 6.721180E-01 | -9.000129E-02 |
| 56 | 0.000000E+00 | 0.000000E+00 | 1.740857E-01 | 6.591026E-03 |
| Surface | $a_8$ | $a_{10}$ | $a_{12}$ | |
| 45 | 1.718737E-01 | -8.827719E-02 | -8.464189E-02 | |
| 46 | 4.593708E-01 | -5.925520E-01 | 1.974861E-01 | |
| 75 | -1.391195E+00 | 1.809610E+00 | -1.353736E+00 | |
| 76 | -3.189583E-01 | 8.003886E-01 | -4.701928E-01 | |
| 55 | -1.273962E+00 | 1.842819E+00 | 4.333422E+00 | |
| 56 | -2.661094E-01 | -6.765009E-01 | 2.151121E+00 | |

FIG. 30

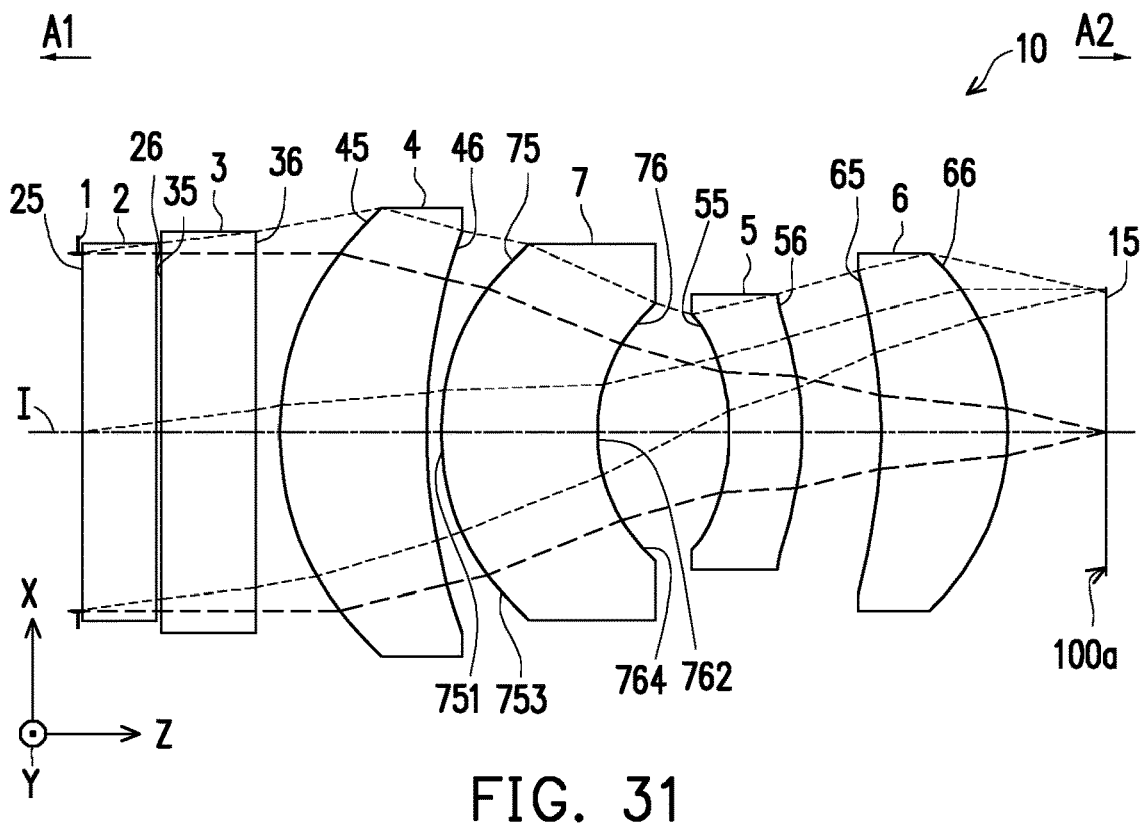
FIG. 31
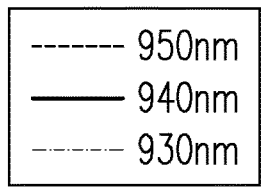
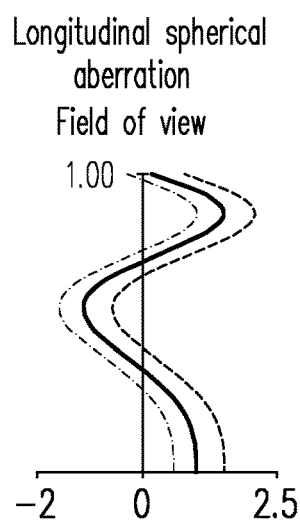
Longitudinal spherical aberration
Field of view
FIG. 32A
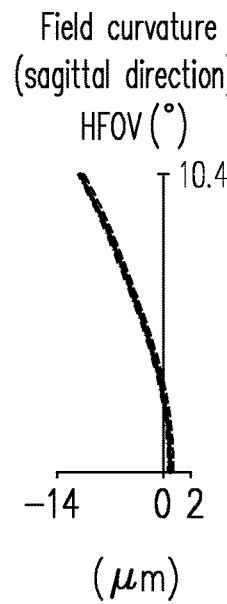
Field curvature (sagittal direction) HFOV (°)
FIG. 32B
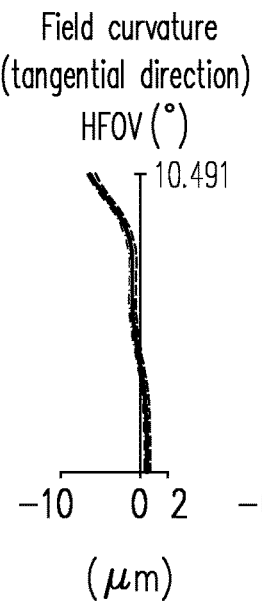
Field curvature (tangential direction) HFOV (°)
FIG. 32C
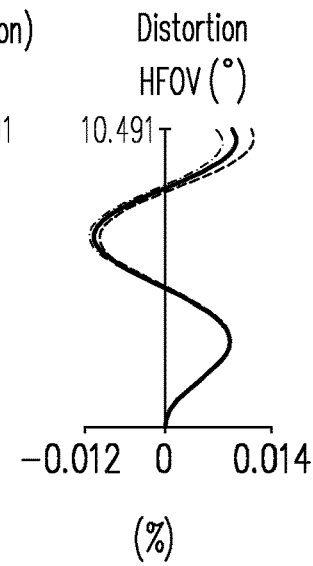
Distortion HFOV (°)
FIG. 32D

| Seventh embodiment | | | | | | | |
|---|---|---|---|---|---|---|---|
| Effective focal length= 2.686 mm, SL=3.568mm, TTL=2.868 mm, | | | | | | | |
| Image height=0.380 mm, Half field of view=8.050°, F-number=2.155 | | | | | | | |
| Element | Surface | Radius (mm) | Thickness (mm) | Material | Refractive index | Abbe number | Focal length (mm) |
| Object | | Infinity | Infinity | | | | |
| Aperture 1 | | Infinity | 0.015 | | | | |
| filter 2 | Light output surface 25 | Infinity | 0.260 | | 1.458 | 67.821 | |
| | Light input surface 26 | Infinity | 0.015 | | | | |
| filter 3 | Light output surface 35 | Infinity | 0.330 | | 1.517 | 64.167 | |
| | Light input surface 36 | Infinity | 0.080 | | | | |
| First lens element 4 | Light output surface 45 | 1.016 | 0.510 | Plastic | 1.545 | 55.987 | 3.210 |
| | Light input surface 46 | 2.045 | 0.050 | | | | |
| Fourth lens element 7 | Light output surface 75 | 0.887 | 0.543 | Plastic | 1.661 | 20.373 | 117.930 |
| | Light input surface 76 | 0.684 | 0.457 | | | | |
| Second lens element 5 | Light output surface 55 | -0.796 | 0.254 | Plastic | 1.642 | 22.409 | -72.292 |
| | Light input surface 56 | -0.909 | 0.273 | | | | |
| Third lens element 6 | Light output surface 65 | -1.448 | 0.441 | Plastic | 1.642 | 22.409 | 2.436 |
| | Light input surface 66 | -0.825 | 0.339 | | | | |
| Structured light generating unit 15 | light emitting reference plane 100a | Infinity | | | | | |

FIG. 33

| Surface | K | $a_2$ | $a_4$ | $a_6$ |
|---|---|---|---|---|
| 45 | 1.365529E-01 | 0.000000E+00 | -7.565803E-02 | -2.046574E-02 |
| 75 | -2.349222E-01 | 0.000000E+00 | 2.128776E-01 | 2.252403E-01 |
| 76 | -1.707353E-01 | 0.000000E+00 | 8.688066E-01 | 3.183406E+00 |
| 55 | -8.120123E-01 | 0.000000E+00 | -9.412881E-02 | 1.037697E+00 |
| 56 | -8.191255E-01 | 0.000000E+00 | 6.752940E-01 | 7.491188E-01 |
| 65 | -1.240274E+00 | 0.000000E+00 | 3.345680E-01 | 1.771793E-01 |
| 66 | -8.955748E-03 | 0.000000E+00 | 5.317619E-02 | 8.310293E-02 |
| Surface | $a_8$ | $a_{10}$ | $a_{12}$ | |
| 45 | -1.456209E-02 | 1.855327E-01 | -2.280952E-01 | |
| 75 | -1.295965E+00 | 4.117860E+00 | -7.000000E+00 | |
| 76 | -2.216032E+01 | 2.421869E+02 | -1.037609E+03 | |
| 55 | -2.441973E+01 | 1.190466E+02 | -8.955040E+02 | |
| 56 | 9.457612E+00 | -1.148925E+02 | 2.940578E+02 | |
| 65 | -1.335971E+00 | -2.785749E+00 | 9.914171E+00 | |
| 66 | 5.607188E-02 | -4.233989E-01 | 4.677248E-01 | |

FIG. 34

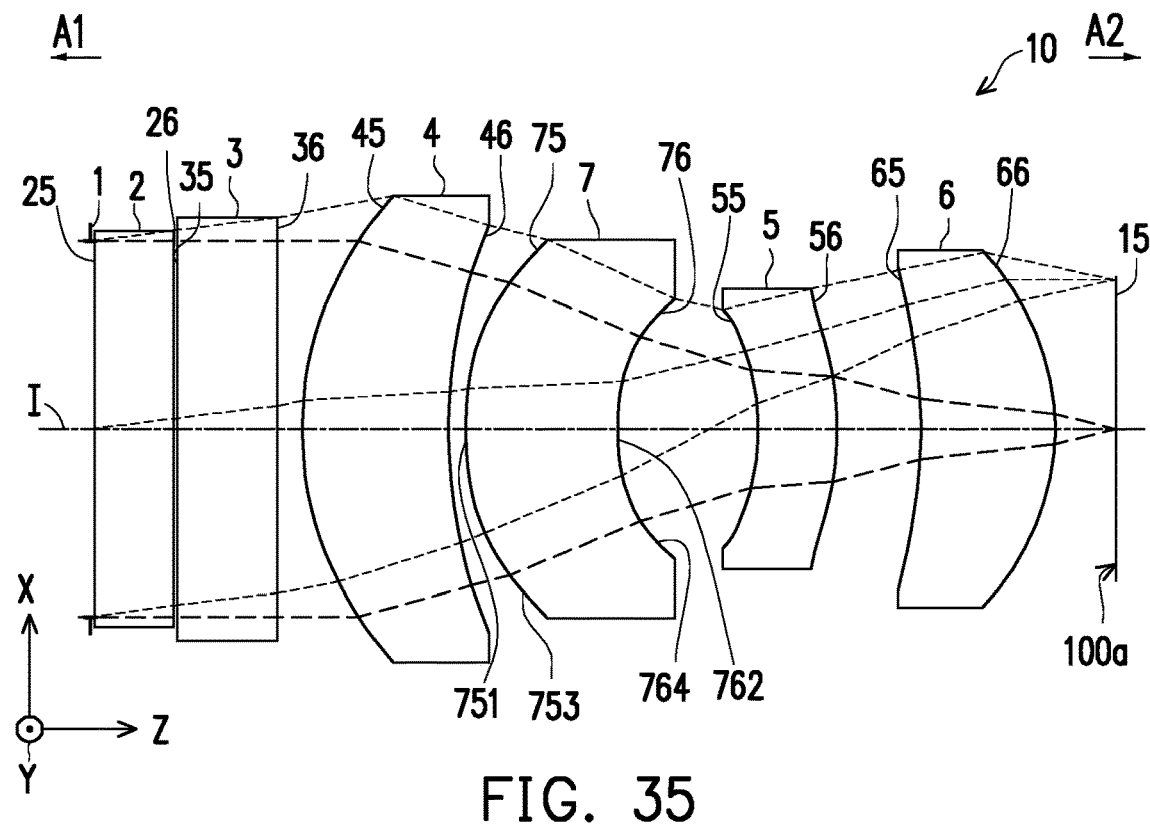
FIG. 35
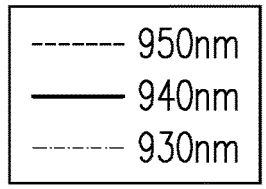
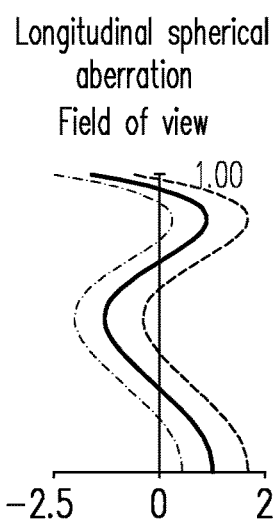
Longitudinal spherical aberration
Field of view
FIG. 36A
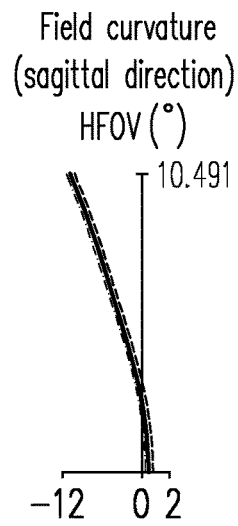
Field curvature (sagittal direction) HFOV (°)
FIG. 36B
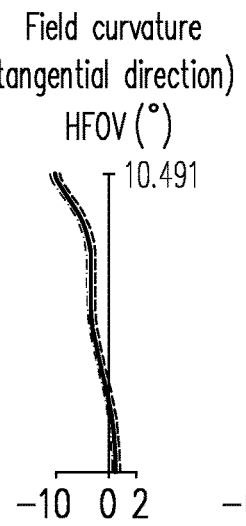
Field curvature (tangential direction) HFOV (°)
FIG. 36C
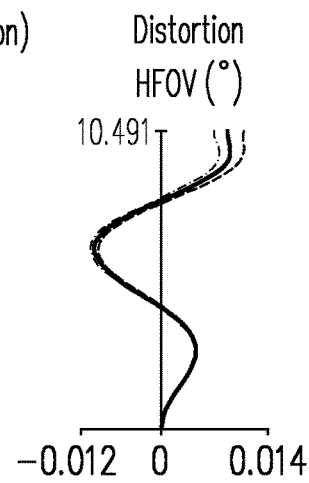
Distortion HFOV (°)
FIG. 36D

| Eighth embodiment |||||||| 
|---|---|---|---|---|---|---|---|
| Effective focal length= 2.684 mm, SL=3.394mm, TTL=2.694 mm, Image height=0.400 mm, Half field of view=8.480°, F-number=2.155 ||||||||
| Element | Surface | Radius (mm) | Thickness (mm) | Material | Refractive index | Abbe number | Focal length (mm) |
| Object |  | Infinity | Infinity |  |  |  |  |
| Aperture 1 |  | Infinity | 0.015 |  |  |  |  |
| filter 2 | Light output surface 25 | Infinity | 0.260 |  | 1.458 | 67.821 |  |
|  | Light input surface 26 | Infinity | 0.015 |  |  |  |  |
| filter 3 | Light output surface 35 | Infinity | 0.330 |  | 1.517 | 64.167 |  |
|  | Light input surface 36 | Infinity | 0.080 |  |  |  |  |
| First lens element 4 | Light output surface 45 | 1.090 | 0.486 | Glass | 1.851 | 40.104 | 2.582 |
|  | Light input surface 46 | 1.767 | 0.056 |  |  |  |  |
| Fourth lens element 7 | Light output surface 75 | 0.976 | 0.502 | Plastic | 1.642 | 22.409 | -14.224 |
|  | Light input surface 76 | 0.706 | 0.467 |  |  |  |  |
| Second lens element 5 | Light output surface 55 | -0.795 | 0.262 | Plastic | 1.642 | 22.409 | -133.058 |
|  | Light input surface 56 | -0.904 | 0.277 |  |  |  |  |
| Third lens element 6 | Light output surface 65 | -1.449 | 0.445 | Plastic | 1.642 | 22.409 | 2.425 |
|  | Light input surface 66 | -0.824 | 0.200 |  |  |  |  |
| Structured light generating unit 15 | light emitting reference plane 100a | Infinity |  |  |  |  |  |

FIG. 37

| Surface | K | $a_2$ | $a_4$ | $a_6$ |
|---|---|---|---|---|
| 45 | 2.034934E-01 | 0.000000E+00 | -6.941709E-02 | -3.662144E-02 |
| 75 | -3.814784E-02 | 0.000000E+00 | 2.713018E-01 | 2.778516E-01 |
| 76 | -1.092890E-01 | 0.000000E+00 | 8.927631E-01 | 4.285918E+00 |
| 55 | -7.811812E-01 | 0.000000E+00 | -1.021891E-01 | 9.130153E-01 |
| 56 | -8.135964E-01 | 0.000000E+00 | 6.759774E-01 | 7.814088E-01 |
| 65 | -1.260624E+00 | 0.000000E+00 | 3.350164E-01 | 1.739131E-01 |
| 66 | -8.972217E-03 | 0.000000E+00 | 5.297424E-02 | 8.642112E-02 |
| Surface | $a_8$ | $a_{10}$ | $a_{12}$ | |
| 45 | -1.899561E-02 | 6.314705E-02 | -4.798620E-02 | |
| 75 | -1.054915E+00 | 4.581877E+00 | -8.994585E+00 | |
| 76 | -2.620078E+01 | 3.134294E+02 | -1.275387E+03 | |
| 55 | -2.382491E+01 | 1.380325E+02 | -1.194078E+03 | |
| 56 | 9.363165E+00 | -1.202326E+02 | 2.823445E+02 | |
| 65 | -1.392754E+00 | -3.160282E+00 | 8.283056E+00 | |
| 66 | 6.778015E-02 | -4.019064E-01 | 2.541701E-01 | |

FIG. 38

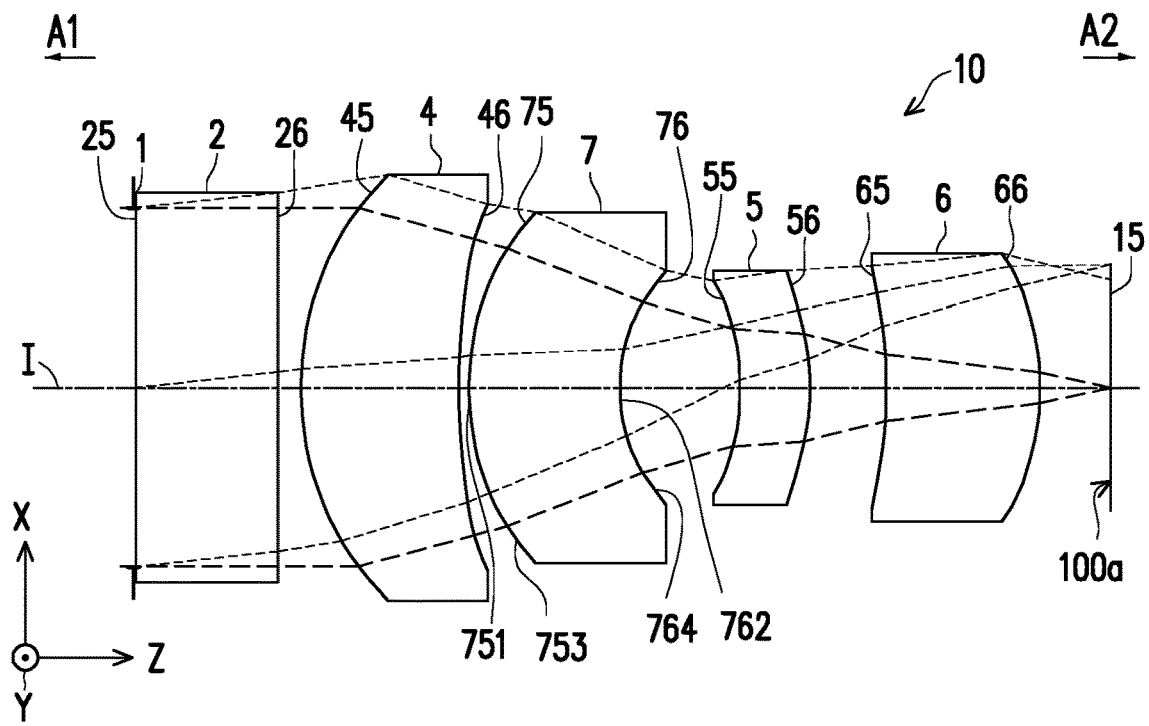
FIG. 39
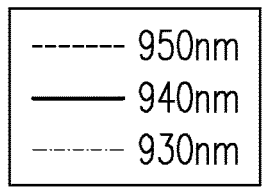
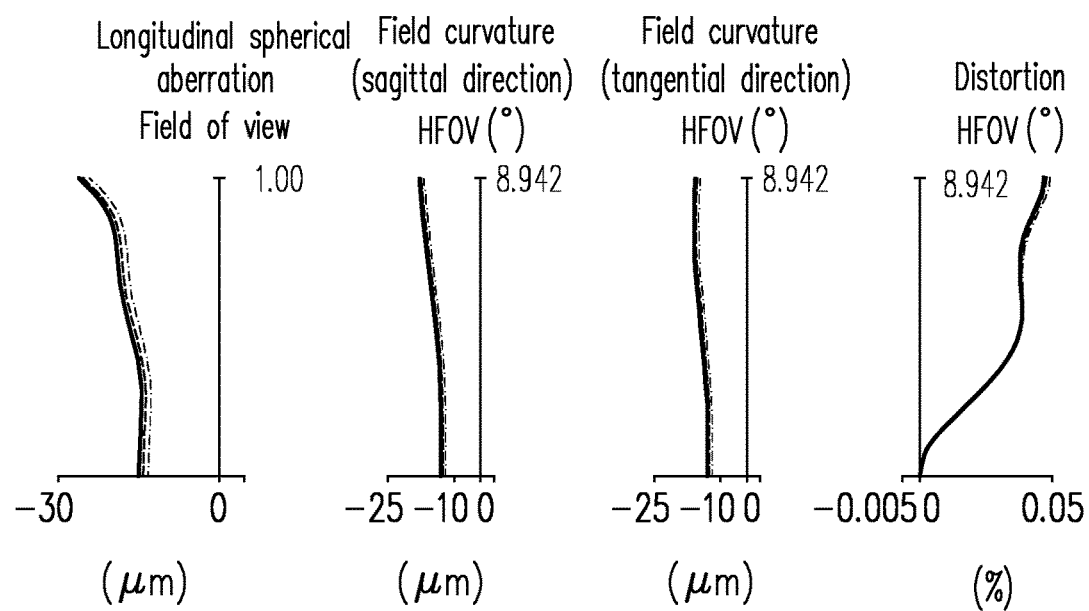
FIG. 40A  FIG. 40B  FIG. 40C  FIG. 40D

| Ninth embodiment |||||||
|---|---|---|---|---|---|---|
| Effective focal length= 2.731 mm, SL=3.445mm, TTL=2.855 mm, |||||||
| Image height=0.430 mm, Half field of view=8.942°, F-number=2.155 |||||||
| Element | Surface | Radius (mm) | Thickness (mm) | Material | Refractive index | Abbe number | Focal length (mm) |
| Object | | Infinity | Infinity | | | | |
| Aperture 1 | | Infinity | 0.010 | | | | |
| filter 2 | Light output surface 25 | Infinity | 0.500 | | 1.458 | 67.821 | |
| | Light input surface 26 | Infinity | 0.080 | | | | |
| First lens element 4 | Light output surface 45 | 1.084 | 0.558 | Plastic | 1.661 | 20.373 | 2.560 |
| | Light input surface 46 | 2.598 | 0.035 | | | | |
| Fourth lens element 7 | Light output surface 75 | 0.949 | 0.531 | Plastic | 1.661 | 20.373 | -6.871 |
| | Light input surface 76 | 0.610 | 0.425 | | | | |
| Second lens element 5 | Light output surface 55 | -0.833 | 0.247 | Plastic | 1.661 | 20.373 | 8.754 |
| | Light input surface 56 | -0.808 | 0.269 | | | | |
| Third lens element 6 | Light output surface 65 | -1.318 | 0.543 | Plastic | 1.661 | 20.373 | 2.800 |
| | Light input surface 66 | -0.878 | 0.248 | | | | |
| Structured light generating unit 15 | light emitting reference plane 100a | Infinity | | | | | |

FIG. 41

| Surface | K | $a_2$ | $a_4$ | $a_6$ |
|---|---|---|---|---|
| 45 | 3.035923E-01 | 0.000000E+00 | -2.837120E-02 | -4.506840E-02 |
| 46 | 1.098733E-01 | 0.000000E+00 | 5.159768E-03 | 3.998278E-02 |
| 75 | -1.168395E+00 | 0.000000E+00 | 1.278616E-01 | 3.581111E-01 |
| 76 | -8.054792E-01 | 0.000000E+00 | 6.406386E-01 | 1.890825E+00 |
| 55 | -6.595071E-01 | 0.000000E+00 | -1.390527E-01 | 1.772768E+00 |
| 56 | -1.006157E+00 | 0.000000E+00 | 7.274198E-01 | 8.636856E-01 |
| 65 | -4.817156E+00 | 0.000000E+00 | 3.925331E-01 | 2.198840E-01 |
| 66 | -9.742917E-03 | 0.000000E+00 | 9.551417E-02 | 6.680968E-02 |
| Surface | $a_8$ | $a_{10}$ | $a_{12}$ | |
| 45 | -1.571805E-03 | 7.362682E-02 | -1.646555E-02 | |
| 46 | 2.281205E-01 | 3.524062E-01 | 6.409739E-01 | |
| 75 | -1.336724E+00 | 3.363171E+00 | -3.456724E-01 | |
| 76 | -3.375195E+00 | -3.431826E+01 | 5.000000E+01 | |
| 55 | -2.670446E+01 | 8.078452E+01 | -6.177254E+02 | |
| 56 | 1.140185E+01 | -1.109085E+02 | 2.264985E+02 | |
| 65 | -1.381072E+00 | -4.057891E+00 | 7.340588E+00 | |
| 66 | -1.793024E-02 | -5.660687E-01 | 3.990959E-01 | |

FIG. 42

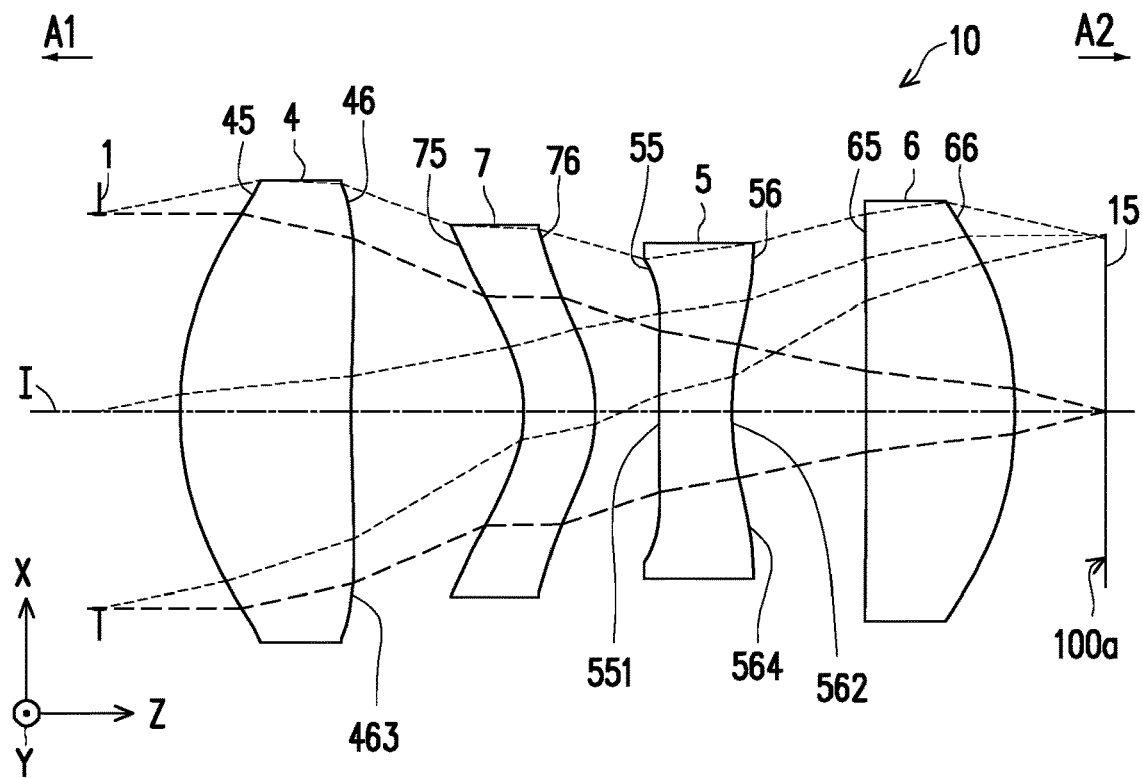
FIG. 43
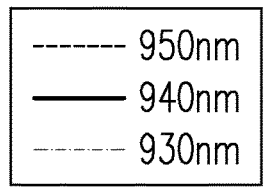
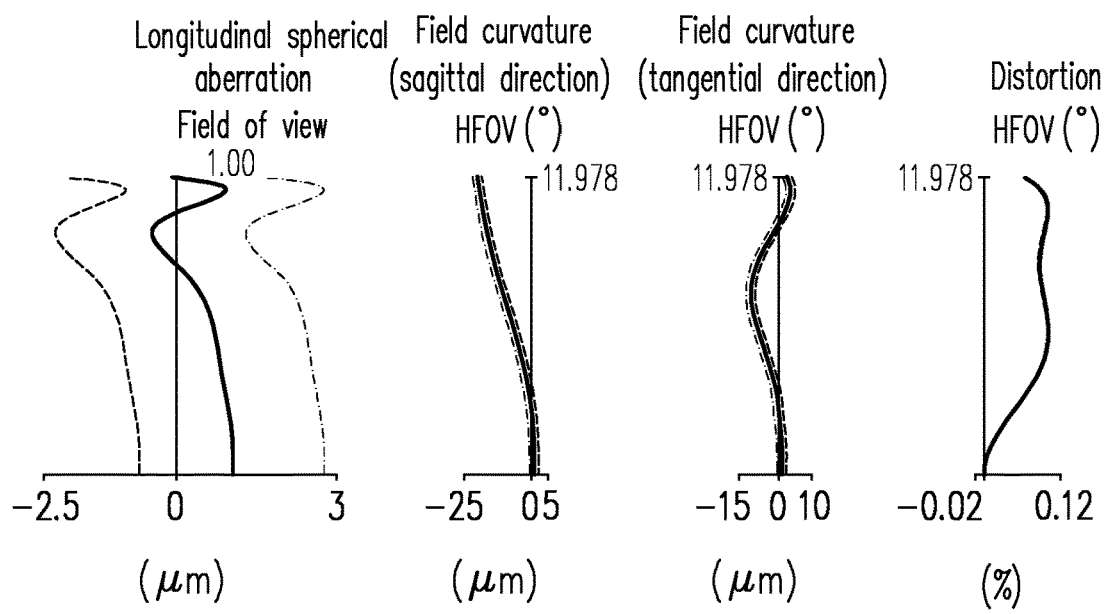
FIG. 44A  FIG. 44B  FIG. 44C  FIG. 44D

| Tenth embodiment |||||||
|---|---|---|---|---|---|---|
| Effective focal length= 2.900 mm, SL=3.529mm, TTL=3.245 mm, Image height=0.250 mm, Half field of view=4.966°, F-number=2.096 |||||||
| Element | Surface | Radius (mm) | Thickness (mm) | Material | Refractive index | Abbe number | Focal length (mm) |
| Object | | Infinity | Infinity | | | | |
| Aperture 1 | | Infinity | 0.284 | | | | |
| First lens element 4 | Light output surface 45 | 1.132 | 0.599 | Plastic | 1.661 | 20.374 | 2.004 |
| | Light input surface 46 | 8.105 | 0.605 | | | | |
| Fourth lens element 7 | Light output surface 75 | -0.464 | 0.250 | Plastic | 1.661 | 20.374 | 7.346 |
| | Light input surface 76 | -0.510 | 0.223 | | | | |
| Second lens element 5 | Light output surface 55 | 8.577 | 0.256 | Plastic | 1.661 | 20.374 | -1.839 |
| | Light input surface 56 | 1.016 | 0.470 | | | | |
| Third lens element 6 | Light output surface 65 | -63.781 | 0.523 | Plastic | 1.661 | 20.374 | 1.959 |
| | Light input surface 66 | -1.225 | 0.320 | | | | |
| Structured light generating unit 15 | light emitting reference plane 100a | Infinity | | | | | |

FIG. 45

| Surface | K | $a_2$ | $a_4$ | $a_6$ |
|---|---|---|---|---|
| 45 | 0.000000E+00 | 0.000000E+00 | -3.608287E-02 | -5.247346E-02 |
| 46 | 0.000000E+00 | 0.000000E+00 | -7.392221E-02 | -1.831398E-01 |
| 75 | -1.747814E+00 | 0.000000E+00 | 5.788875E-01 | 1.475261E+00 |
| 76 | -2.506271E+00 | 0.000000E+00 | 3.699236E-01 | 1.458804E+00 |
| 55 | 0.000000E+00 | 0.000000E+00 | 1.502496E-01 | -6.160550E+00 |
| 56 | 0.000000E+00 | 0.000000E+00 | -1.101431E+00 | 1.871369E-01 |
| Surface | $a_8$ | $a_{10}$ | $a_{12}$ | |
| 45 | -5.905597E-02 | 4.521979E-02 | -2.981414E-01 | |
| 46 | 2.859462E-01 | -8.164525E-01 | 6.051086E-01 | |
| 75 | -6.988496E+00 | 9.442611E+00 | -3.951493E+00 | |
| 76 | -2.725247E+00 | 0.000000E+00 | 0.000000E+00 | |
| 55 | 1.941806E+01 | -3.787932E+01 | 1.106281E+01 | |
| 56 | 3.946908E+00 | -1.521310E+01 | 1.899465E+01 | |

FIG. 46

| Condition | First embodiment | Second embodiment | Third embodiment | Fourth embodiment |
|---|---|---|---|---|
| T1 | 0.575 | 0.557 | 0.555 | 0.538 |
| G12 | 0.613 | 0.473 | 0.472 | 0.473 |
| T2 | 0.610 | 0.665 | 0.670 | 0.605 |
| G23 | 0.431 | 0.626 | 0.560 | 0.386 |
| T3 | 0.546 | 0.910 | 0.898 | 0.928 |
| TTL | 3.605 | 3.492 | 3.621 | 3.599 |
| SL | 4.205 | 4.092 | 4.221 | 4.199 |
| BFL | 0.830 | 0.260 | 0.466 | 0.669 |
| EFL | 2.729 | 2.729 | 2.729 | 2.729 |
| TL | 2.775 | 3.231 | 3.155 | 2.930 |
| ALT | 1.731 | 2.133 | 2.124 | 2.071 |
| AAG | 1.044 | 1.099 | 1.031 | 0.859 |

FIG. 47

| Condition | First embodiment | Second embodiment | Third embodiment | Fourth embodiment |
|---|---|---|---|---|
| SL/AAG | 4.029 | 3.724 | 4.093 | 4.887 |
| ALT/T1 | 3.012 | 3.829 | 3.824 | 3.850 |
| TL/(T3+BFL) | 2.016 | 2.761 | 2.314 | 1.835 |
| SL/EFL | 1.541 | 1.499 | 1.547 | 1.539 |
| EFL/(T1+T2) | 2.303 | 2.233 | 2.226 | 2.388 |
| ALT/(G12+T2) | 1.416 | 1.874 | 1.859 | 1.920 |
| TL/(G23+T3) | 2.839 | 2.104 | 2.165 | 2.231 |
| ALT/AAG | 1.659 | 1.941 | 2.059 | 2.410 |
| (T1+T3)/T2 | 1.838 | 2.206 | 2.168 | 2.422 |
| TTL/ALT | 2.082 | 1.637 | 1.705 | 1.738 |
| SL/(T2+G23+T3) | 2.649 | 1.859 | 1.984 | 2.189 |
| TL/(T1+G23) | 2.759 | 2.732 | 2.830 | 3.172 |
| (T1+G12+T2)/T3 | 3.290 | 1.862 | 1.891 | 1.743 |
| (G23+T3)/T1 | 1.700 | 2.758 | 2.624 | 2.442 |
| ALT/(T2+T3) | 1.497 | 1.354 | 1.354 | 1.351 |
| (T1+BFL)/T2 | 2.303 | 1.228 | 1.523 | 1.995 |
| AAG/T2 | 1.711 | 1.652 | 1.538 | 1.420 |
| EFL/AAG | 2.615 | 2.484 | 2.646 | 3.176 |

FIG. 48

| Condition | Fifth embodiment | Sixth embodiment | Seventh embodiment | Eighth embodiment | Ninth embodiment | Tenth embodiment |
|---|---|---|---|---|---|---|
| T1 | 0.540 | 0.449 | 0.510 | 0.486 | 0.558 | 0.599 |
| G14 | 0.788 | 0.712 | 0.050 | 0.056 | 0.035 | 0.605 |
| T4 | 0.341 | 0.792 | 0.543 | 0.502 | 0.531 | 0.250 |
| G42 | 0.482 | 0.788 | 0.457 | 0.467 | 0.425 | 0.223 |
| T2 | 0.386 | 0.354 | 0.254 | 0.262 | 0.247 | 0.256 |
| G23 | 0.079 | 0.050 | 0.273 | 0.277 | 0.269 | 0.470 |
| T3 | 0.424 | 0.281 | 0.441 | 0.445 | 0.543 | 0.523 |
| G12 | 1.611 | 2.292 | 1.050 | 1.026 | 0.991 | 1.078 |
| TTL | 3.358 | 3.757 | 2.868 | 2.694 | 2.855 | 3.245 |
| SL | 3.659 | 4.111 | 3.568 | 3.394 | 3.445 | 3.529 |
| BFL | 0.318 | 0.332 | 0.339 | 0.200 | 0.248 | 0.320 |
| EFL | 2.899 | 2.899 | 2.686 | 2.684 | 2.731 | 2.900 |
| TL | 3.040 | 3.426 | 2.529 | 2.494 | 2.607 | 2.926 |
| ALT | 1.690 | 1.876 | 1.748 | 1.694 | 1.878 | 1.628 |
| AAG | 1.349 | 1.550 | 0.781 | 0.800 | 0.729 | 1.298 |

FIG. 49

| Condition | Fifth embodiment | Sixth embodiment | Seventh embodiment | Eighth embodiment | Ninth embodiment | Tenth embodiment |
|---|---|---|---|---|---|---|
| SL/AAG | 2.712 | 2.652 | 4.571 | 4.242 | 4.727 | 2.719 |
| ALT/T1 | 3.132 | 4.181 | 3.426 | 3.489 | 3.366 | 2.717 |
| TL/(T3+BFL) | 4.095 | 5.595 | 3.241 | 3.869 | 3.297 | 3.473 |
| SL/EFL | 1.262 | 1.418 | 1.328 | 1.265 | 1.261 | 1.217 |
| EFL/(T1+T2) | 3.131 | 3.610 | 3.516 | 3.592 | 3.393 | 3.390 |
| ALT/(G12+T2) | 0.846 | 0.709 | 1.341 | 1.316 | 1.518 | 1.220 |
| TL/(G23+T3) | 6.050 | 10.367 | 3.539 | 3.457 | 3.214 | 2.948 |
| ALT/AAG | 1.253 | 1.210 | 2.240 | 2.118 | 2.577 | 1.254 |
| (T1+T3)/T2 | 2.494 | 2.057 | 3.752 | 3.557 | 4.459 | 4.377 |
| TTL/ALT | 1.986 | 2.003 | 1.641 | 1.590 | 1.520 | 1.993 |
| SL/(T2+G23+T3) | 4.117 | 6.002 | 3.685 | 3.452 | 3.256 | 2.826 |
| TL/(T1+G23) | 4.917 | 6.873 | 3.227 | 3.272 | 3.153 | 2.738 |
| (T1+G12+T2)/T3 | 5.986 | 11.030 | 4.111 | 3.986 | 3.310 | 3.699 |
| (G23+T3)/T1 | 0.931 | 0.737 | 1.400 | 1.486 | 1.454 | 1.656 |
| ALT/(T2+T3) | 2.086 | 2.953 | 2.516 | 2.399 | 2.380 | 2.090 |
| (T1+BFL)/T2 | 2.221 | 2.201 | 3.349 | 2.621 | 3.267 | 3.585 |
| AAG/T2 | 3.492 | 4.372 | 3.078 | 3.059 | 2.953 | 5.063 |
| EFL/AAG | 2.149 | 1.870 | 3.441 | 3.355 | 3.747 | 2.235 |

FIG. 50

OPTICAL LENS ASSEMBLY

CROSS REFERENCE TO RELATED APPLICATION

This application claims the priority benefit of China application serial no. 201811425823.3, filed on Nov. 27, 2018. The entirety of the above-mentioned patent application is hereby incorporated by reference herein and made a part of specification.

BACKGROUND OF THE INVENTION

Field of the Invention

The disclosure relates to an optical lens device and particularly relates to an optical lens assembly.

Description of Related Art

In recent years, the applications of portable electronic devices have become more and more diverse. In addition to photo shooting and video recording, 3D structured light projection technology is suitable for facial or object recognition. The 3D structured light projection is a specific form of image formed by a plurality of point light sources emitting through the optical lens assembly to form an image, such as a point, a line or a grid, etc. However, resolution is particularly crucial in order for the projection image to be definitely identified. In addition, to meet the thin and light needs of the portable electronic devices, how to design an optical lens assembly with small size and good imaging quality is the focus of research and development.

Furthermore, in the existing 3D sensing technology, a plurality sets of near-infrared light emitting units are applied to detect the environment in front of the lens element through a plurality of parallel lights generated by a plurality sets of collimating lens elements. In other words, a parallel light is generated by a near-infrared light through a set of collimating lens elements, and with the design of a plurality sets, a wide range of environments may be detected. However, the manufacturing cost of the plurality sets of collimating lens elements with the plurality sets of near-infrared light emitting units is expensive, and the yield is not desirable. Therefore, how to lower the cost is also an issue to be solved.

SUMMARY OF THE DISCLOSURE

The disclosure provides an optical lens assembly that renders small size, low cost, and favorable imaging quality.

An embodiment of this disclosure provides an optical lens assembly, applied to generate a plurality of light sources from a plurality of near infrared light beams emitted by a structured light generating unit having a plurality of light sources and passed through the optical lens assembly. A side facing the structured light generating unit having a plurality of light sources is a light input side, another side opposite thereto being a light output side. The optical lens assembly includes a first lens element, a second lens element and a third lens element arranged in a sequence from a light output side to a light input side along an optical axis. Each of the first lens element, the second lens element, and the third lens element includes a light output surface facing toward the light output side and a light input surface facing toward the light input side. The first lens element is arranged to be a lens element having refracting power in a first order from the light output side to the light input side. The second lens element is arranged to be a lens element having refracting power in a second order from the light input side to the light output side. The third lens element is arranged to be a lens element having refracting power in a first order from the light input side to the light output side. The curvature of cross-sectional lines of the light input surface and the light output surface of the first lens element, the light input surface and the light output surface of the second lens element, and the light input surface and the light output surface of the third lens element on a plane containing the optical axis and parallel to an XZ plane are respectively different from the curvature of cross-sectional lines of the light input surface and the light output surface of the first lens element, the light input surface and the light output surface of the second lens element, and the light input surface and the light output surface of the third lens element on a plane containing the optical axis and parallel to a YZ plane, wherein an X direction and a Y direction are perpendicular to each other and perpendicular to the optical axis, and a Z direction is parallel to the optical axis, and the XZ plane is defined by the X direction and the Y direction, and the YZ plane is defined by the Y direction and the Z direction. The optical lens assembly satisfies: $SL/AAG \leq 6.500$, wherein SL is a distance from an optical surface of one of optical elements closest to the light output side of the optical lens assembly to the structured light generating unit having the plurality of light sources along the optical axis, and AAG is a sum of the air gaps between all lens elements having refracting power of the optical lens assembly along the optical axis.

Based on the above, the beneficial effect of the optical lens assembly of the embodiment of this disclosure lies in that: a plurality of linear spots having good resolution and parallel to each other may be generated by a row of a plurality of point light sources in a parallel arrangement projecting through an optical assembly having at least three lens elements. With design of a row of a plurality of point light sources in a parallel arrangement, the goal of reducing cost may be successfully achieved. In addition, since the optical lens assembly has the light and thing advantages, and the needs for light and thin of portable electronic devices may thus be satisfied.

To provide a further understanding of the aforementioned and other features and advantages of the disclosure, exemplary embodiments, together with the reference drawings, are described in detail below.

BRIEF DESCRIPTION OF THE DRAWINGS

FIG. 4 is a schematic view illustrating a surface structure of a lens element according to Example 1.

FIG. 5 is a schematic view illustrating a surface structure of a lens element according to Example 2.

FIG. 6 is a schematic view illustrating a surface structure of a lens element according to Example 3.

FIG. 9 illustrates detailed optical data of the optical lens assembly according to the first embodiment of the disclosure.

FIG. 10 illustrates aspheric parameters of the optical lens assembly according to the first embodiment of the disclosure.

FIG. 11 is a cross-sectional schematic view of an optical lens assembly on a plane parallel to the XZ plane according to the second embodiment of the disclosure.

FIG. 12A to FIG. 12D are diagrams illustrating a longitudinal spherical aberration and various aberrations of the optical lens assembly according to the second embodiment.

FIG. 13 illustrates detailed optical data of the optical lens assembly according to the second embodiment of the disclosure.

FIG. 14 illustrates aspheric parameters of the optical lens assembly according to the second embodiment of the disclosure.

FIG. 15 is a cross-sectional schematic view of an optical lens assembly on a plane parallel to the XZ plane according to the third embodiment of the disclosure.

FIG. 16A to FIG. 16D are diagrams illustrating a longitudinal spherical aberration and various aberrations of the optical lens assembly according to the third embodiment.

FIG. 17 illustrates detailed optical data of the optical lens assembly according to the third embodiment of the disclosure.

FIG. 18 illustrates aspheric parameters of the optical lens element according to the third embodiment of the disclosure.

FIG. 19 is a cross-sectional schematic view of an optical lens assembly on a plane parallel to the XZ plane according to the fourth embodiment of the disclosure.

FIG. 20A to FIG. 20D are diagrams illustrating a longitudinal spherical aberration and various aberrations of the optical imaging lens according to the fourth embodiment.

FIG. 21 illustrates detailed optical data of the optical imaging lens according to the fourth embodiment of the disclosure.

FIG. 22 illustrates aspheric parameters of the optical imaging lens according to the fourth embodiment of the disclosure.

FIG. 23 is a cross-sectional schematic view of an optical lens assembly on a plane parallel to the XZ plane according to the fifth embodiment of the disclosure.

FIG. 24A to FIG. 24D are diagrams illustrating a longitudinal spherical aberration and various aberrations of the optical lens assembly according to the fifth embodiment.

FIG. 25 illustrates detailed optical data of the optical lens assembly according to the fifth embodiment of the disclosure.

FIG. 26 illustrates aspheric parameters of the optical lens assembly according to the fifth embodiment of the disclosure.

FIG. 27 is a cross-sectional schematic view of an optical lens assembly on a plane parallel to the XZ plane according to the sixth embodiment of the disclosure.

FIG. 28A to FIG. 28D are diagrams illustrating a longitudinal spherical aberration and various aberrations of the optical lens assembly according to the sixth embodiment.

FIG. 29 illustrates detailed optical data of the optical imaging lens according to the sixth embodiment of the disclosure.

FIG. 30 illustrates aspheric parameters of the optical lens assembly according to the sixth embodiment of the disclosure.

FIG. 31 is a cross-sectional schematic view of an optical lens assembly on a plane parallel to the XZ plane according to the seventh embodiment of the disclosure.

FIG. 32A to FIG. 32D are diagrams illustrating a longitudinal spherical aberration and various aberrations of the optical lens assembly according to the seventh embodiment.

FIG. 33 illustrates detailed optical data of the optical lens assembly according to the seventh embodiment of the disclosure.

FIG. 34 illustrates aspheric parameters of the optical lens assembly according to the seventh embodiment of the disclosure.

FIG. 35 is a cross-sectional schematic view of an optical lens assembly on a plane parallel to an XZ plane according to the eighth embodiment of the disclosure.

FIG. 36A to FIG. 36D are diagrams illustrating a longitudinal spherical aberration and various aberrations of the optical lens assembly according to the eighth embodiment.

FIG. 37 illustrates detailed optical data of the optical imaging lens element according to the eighth embodiment of the disclosure.

FIG. 38 illustrates aspheric parameters of the optical imaging lens element according to the eighth embodiment of the disclosure.

FIG. 39 is a cross-sectional schematic view of an optical lens assembly on a plane parallel to an XZ plane according to the ninth embodiment of the disclosure.

FIG. 40A to FIG. 40D are diagrams illustrating a longitudinal spherical aberration and various aberrations of the optical lens assembly according to the ninth embodiment.

FIG. 41 illustrates detailed optical data of the optical imaging lens element according to the ninth embodiment of the disclosure.

FIG. 42 illustrates aspheric parameters of the optical imaging lens element according to the ninth embodiment of the disclosure.

FIG. 43 is a cross-sectional schematic view of an optical lens assembly on a plane parallel to an XZ plane according to the tenth embodiment of the disclosure.

FIG. 44A to FIG. 44D are diagrams illustrating a longitudinal spherical aberration and various aberrations of the optical lens assembly according to the tenth embodiment.

FIG. 45 illustrates detailed optical data of the optical imaging lens element according to the tenth embodiment of the disclosure.

FIG. 46 illustrates aspheric parameters of the optical imaging lens element according to the tenth embodiment of the disclosure.

FIG. 47 and FIG. 48 illustrate respective crucial parameters and values of the correlation of the optical lens assembly according to the first to fourth embodiments of the disclosure.

FIG. 49 and FIG. 50 illustrate respective crucial parameters and values of the correlation of the optical lens assembly according to the fifth to tenth embodiments of the disclosure.

DESCRIPTION OF THE EMBODIMENTS

Figure 1A:
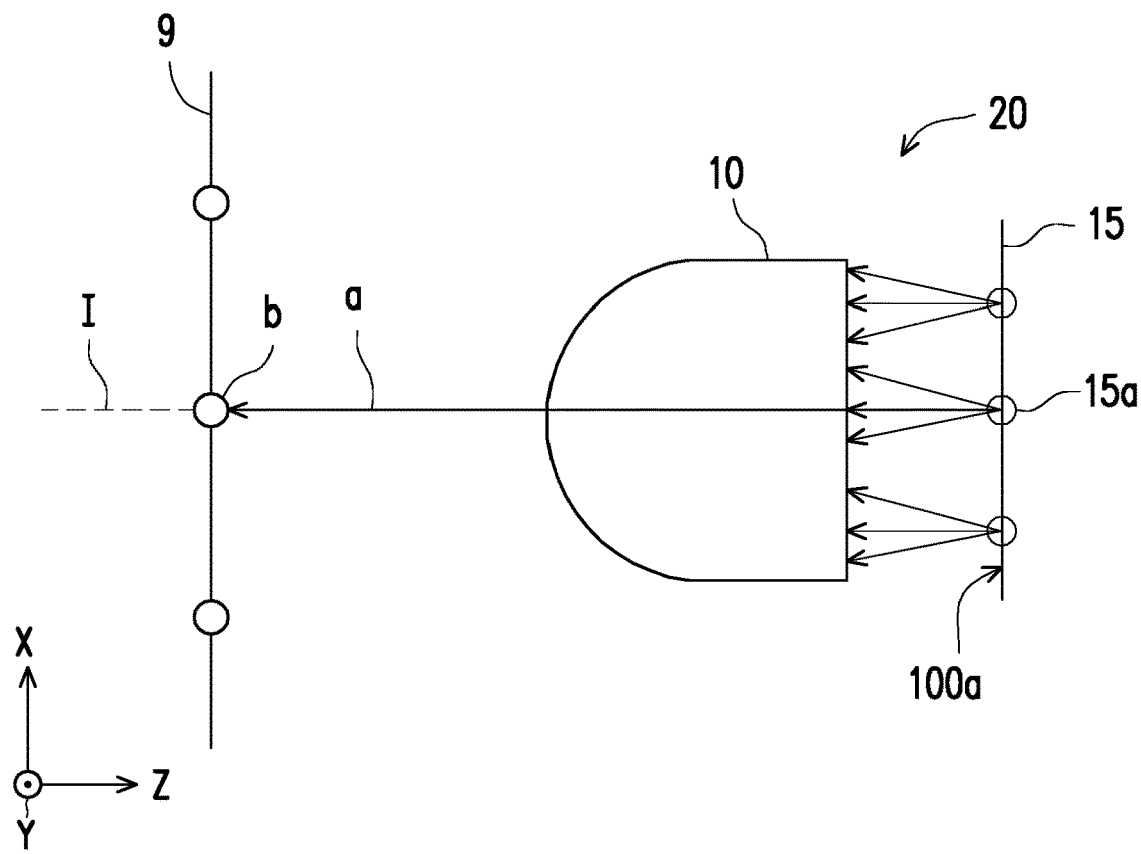
FIG. 1A is a schematic view, illustrating the application of the optical lens assembly of the disclosure to a lens element of a 3D sensing transmitter.
Figures 1B, 1C:
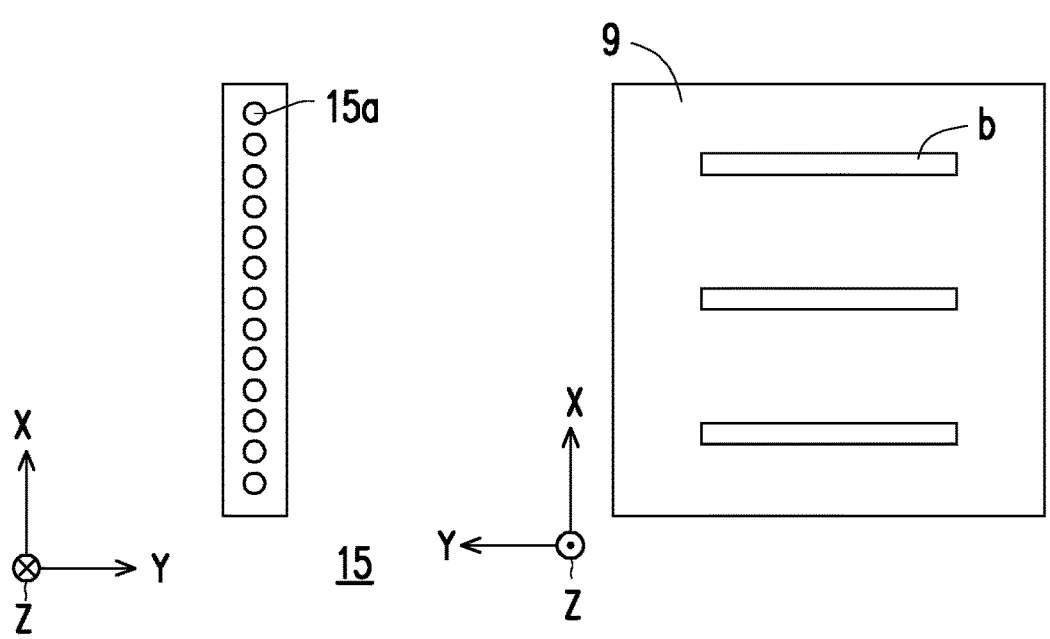
FIG. 1B is a front view of an embodiment of a structured light generating unit having a plurality of light sources of FIG. 1A facing toward a position Z direction.
FIG. 1C is a front view of a structured light generating unit having a plurality of light sources of FIG. 1B forming images on an object facing toward a negative Z direction.

Please refer to FIG. 1A, FIG. 1B, and FIG. 1C. A light direction of a 3D sensing transmitter 20 is that a plurality of near-infrared light sources are emitted from a structured light generating unit 15 having a plurality of light sources, and a plurality of light sources (illustrated as light beam a) are generated by an optical lens assembly 10 of the embodiment of this disclosure to detect the environment in front of the lens. In an embodiment, the structured light generating unit 15 having a plurality of light sources includes a plurality of near-infrared light sources 15a in a linear arrangement as illustrated in FIG. 1B. In other embodiments, the arrangement of the structured light generating unit 15 having a plurality of light sources may also be an array arrangement, a circular arrangement or other arrangement manners. However, the disclosure is not limited thereto. The near-infrared light sources 15a may be infrared laser light sources. A reference plane including the light emitting position of the near-infrared light sources 15a forms a light emitting reference plane 100a of the structured light generating unit 15 having a plurality of light sources. In an embodiment, the light emitting reference plane 100a is perpendicular to the optical axis I, as illustrated in FIG. 1A. In addition, through the plurality of beams projected by the structured light generating unit 15 having a plurality of light sources including the near-infrared light source 15a in a linear arrangement, a plurality of linear spots b having good resolution and parallel to each other may be generated on an object 9 by the optical lens assembly 10, as illustrated in FIG. 1C. In the embodiments of FIG. 1B and FIG. 1C, the plurality of the near-infrared light sources 15a are arranged along an X direction, and the plurality of linear spots b extended along Y direction and arranged along the X direction may be generated on the object 9. However, the disclosure is not limited thereto.

The criterion for determining the optical specifications of the embodiment of the present disclosure is that a reversely tracking of the optical direction is assumed to be a parallel image forming ray focused from the light output side through the optical lens assembly 10 to the light emitting reference plane 100a of the structured light generating unit 15 having a plurality of light sources.

Figure 2:
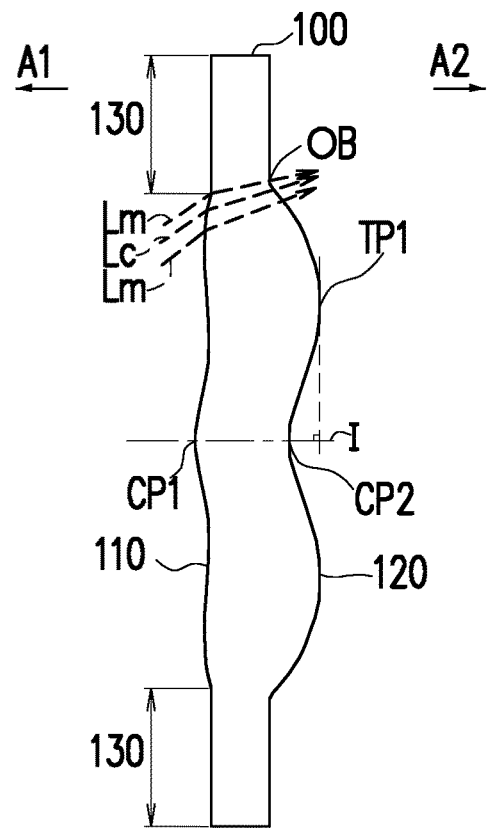
FIG. 2 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "a light output (or light input) surface of a lens element" refers to a specific region of that surface of the lens element at which imaging rays can pass through that specific region. Imaging rays include at least two types of rays: a chief ray Lc and a marginal ray Lm (as illustrated in FIG. 2). A light output (or light input) surface of a lens element can be characterized as having several regions, including an optical axis region, a periphery region, and, in some cases, one or more intermediate regions, as discussed more fully below.

FIG. 2 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 2, a first central point CP1 may be present on the light output surface 110 of lens element 100 and a second central point CP2 may be present on the light input surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as illustrated in FIG. 5), and the Nth transition point (farthest from the optical axis I). The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the light input side A2 of the lens element. The shape of a region is concave if the extension line of a collimated ray being parallel to the optical axis I and passing through the region intersects the optical axis I on the light output side A1 of the lens element.

Additionally, referring to FIG. 2, the lens element 100 may also have a mounting portion 130 extending radially outward from the optical boundary OB. The mounting portion 130 is typically used to physically secure the lens element to a corresponding element of the optical system (not illustrated). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 3:
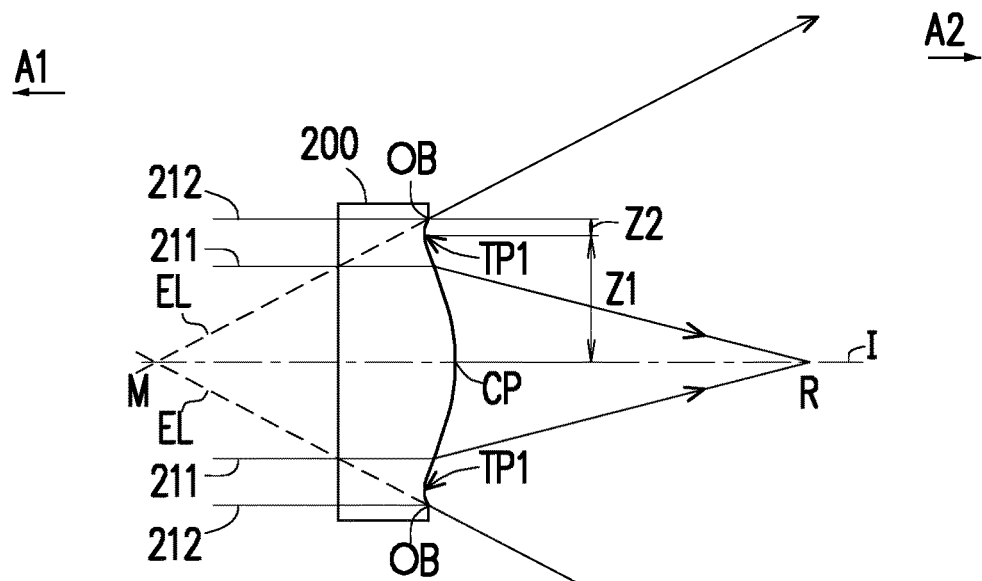
FIG. 3 is a schematic view illustrating a surface convex-and-concave structure and a focal point of a lens element.

Referring to FIG. 3, optical axis region Z1 is defined between central point CP and first transition point TP1. Periphery region Z2 is defined between TP1 and the optical boundary OB of the surface of the lens element. Collimated ray 211 intersects the optical axis I on the light input side A2 of lens element 200 after passing through optical axis region Z1, i.e., the focal point of collimated ray 211 after passing through optical axis region Z1 is on the light input side A2 of the lens element 200 at point R in FIG. 3. Accordingly, since the ray itself intersects the optical axis I on the light input side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the light output side A1 of lens element 200, i.e., the focal point of collimated ray 212 after passing through periphery region Z2 is on the light output side A1 at point M in FIG. 3. Accordingly, since the extension line EL of the ray intersects the optical axis I on the light output side A1 of the lens element 200, periphery region Z2 is concave. In the lens element 200 illustrated in FIG. 3, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens element surface in the optical axis region. The R value is commonly used in conventional optical design software such as Zemax and CodeV. The R value usually appears in the lens element data sheet in the software. For a light output surface, a positive R value defines that the optical axis region of the light output surface is convex, and a negative R value defines that the optical axis region of the light output surface is concave. Conversely, for a light input surface, a positive R value defines that the optical axis region of the light input surface is concave, and a negative R value defines that the optical axis region of the light input surface is convex. The result found by using this method should be consistent with the method utilizing intersection of the optical axis by rays/extension lines mentioned above, which determines surface shape by referring to whether the focal point of a collimated ray being parallel to the optical axis I is on the light output side or the light input side of a lens element. As used herein, the terms "a shape of a region is convex (concave)," "a region is convex (concave)," and "a convex- (concave-) region," can be used alternatively.

FIG. 4, FIG. 5 and FIG. 6 illustrate examples of determining the shape of lens element regions and the boundaries of regions under various circumstances, including the optical axis region, the periphery region, and intermediate regions as set forth in the present specification.

FIG. 4 is a radial cross-sectional view of a lens element 300. As illustrated in FIG. 4, only one transition point TP1 appears within the optical boundary OB of the light input surface 320 of the lens element 300. Optical axis region Z1 and periphery region Z2 of the light input surface 320 of lens element 300 are illustrated. The R value of the light input surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 4, since the shape of the optical axis region Z1 is concave, the shape of the periphery region Z2 will be convex as the shape changes at the transition point TP1.

FIG. 5 is a radial cross-sectional view of a lens element 400. Referring to FIG. 5, a first transition point TP1 and a second transition point TP2 are present on the light output surface 410 of lens element 400. The optical axis region Z1 of the light output surface 410 is defined between the optical axis I and the first transition point TP1. The R value of the light output surface 410 is positive (i.e., R>0). Accordingly, the optical axis region Z1 is convex.

The periphery region Z2 of the light output surface 410, which is also convex, is defined between the second transition point TP2 and the optical boundary OB of the light output surface 410 of the lens element 400. Further, intermediate region Z3 of the light output surface 410, which is concave, is defined between the first transition point TP1 and the second transition point TP2. Referring once again to FIG. 5, the light output surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the light output surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 6 is a radial cross-sectional view of a lens element 500. Lens element 500 has no transition point on the light output surface 510 of the lens element 500. For a surface of a lens element with no transition point, for example, the light output surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 6, the optical axis region Z1 of the light output surface 510 is defined between the optical axis I and 50% of the distance between the optical axis I and the optical boundary OB. The R value of the light output surface 510 is positive (i.e., R>0). Accordingly, the optical axis region Z1 is convex. For the light output surface 510 of the lens element 500, because there is no transition point, the periphery region Z2 of the light output surface 510 is also convex. It should be noted that lens element 500 may have a mounting portion (not illustrated) extending radially outward from the periphery region Z2.

Figure 7A:
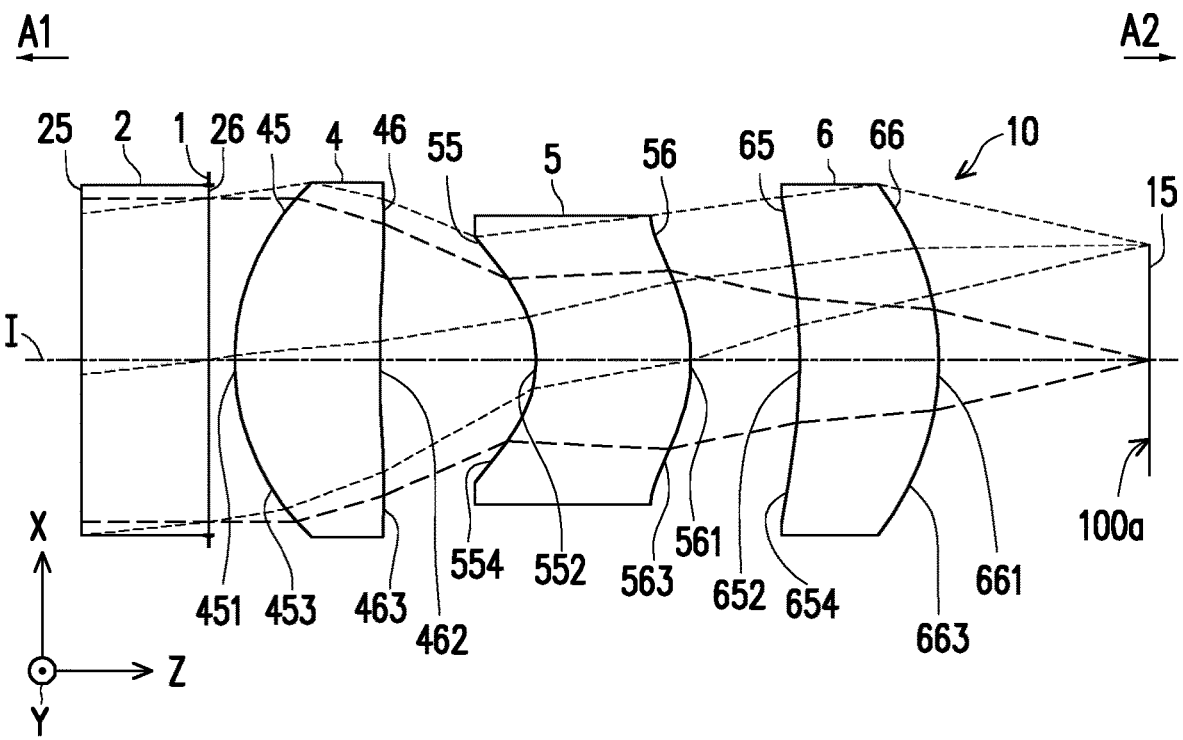
FIG. 7A is a cross-sectional schematic view of an optical lens assembly on a plane parallel to a XZ plane according to the first embodiment of the disclosure.
Figure 7B:
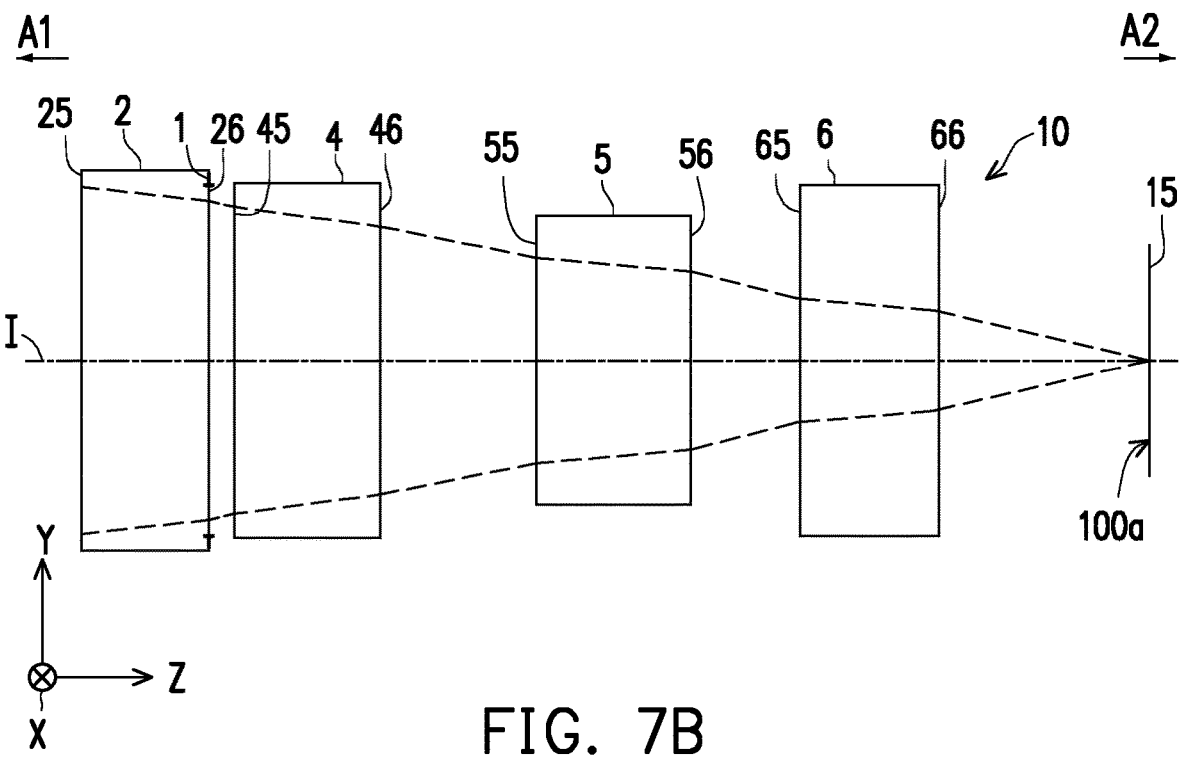
FIG. 7B is a cross-sectional schematic view of an optical lens assembly on a plane parallel to a YZ plane according to the first embodiment of the disclosure.

FIG. 7A is a cross-sectional schematic view of an optical lens assembly on a plane parallel to a XZ plane according to the first embodiment of the disclosure. FIG. 7B is a cross-sectional schematic view of an optical lens assembly on a plane parallel to a YZ plane according to the first embodiment of the disclosure. FIG. 8A to FIG. 8D are diagrams illustrating a longitudinal spherical aberration and various aberrations of the optical lens assembly according to the first embodiment. Please refer to FIG. 7A and FIG. 7B first. The optical lens assembly 10 of the first embodiment of the present disclosure is mainly composed of three lens elements. In this embodiment, the optical lens assembly 10 includes a filter 2, an aperture 1, a first lens element 4, a second lens element 5, a third lens element 6 are arranged along an optical axis I in a sequence from a light output side A1 to a light input side A2 along the optical axis I of the the optical lens assembly 10. The first lens element 4, the second lens element 5, the third lens element 6 are all cylindrical lens elements, and each has light output surfaces 45, 55, 65, facing the light output side A1 and allowing the plurality of near-infrared light sources passing through, and light input surfaces 46, 56, 66, facing the light input side A2 and allowing the plurality of near-infrared light sources passing through. It should be further elaborated that the light input side A2 is a side facing toward the structured light generating unit 15 having a plurality of light sources, and the opposite side is the light output side A1.

In detail, in this embodiment, the curvature of cross-sectional lines on a plane including the optical axis I and parallel to the XZ plane of the light input surfaces 46, 56, and 66 and the light output surfaces 45, 55, and 65 of the first lens element 4, the second lens element 5, and the third lens element 6 are respectively different from the curvature of cross-sectional lines on a plane including the optical axis I and parallel to the YZ plane of the light input surfaces 46, 56, and 66 and the light output surfaces 45, 55, and 65 of the first lens element 4, the second lens element 5, and the third lens element 6. To be more specific, in this embodiment, the curvature of cross-sectional lines on a plane including the optical axis I and parallel to the YZ plane of the light input surfaces 46, 56, and 66 and the light output surfaces 45, 55, and 65 of the first lens element 4, the second lens element 5, and the third lens element 6 are straight lines, as illustrated in FIG. 7A and FIG. 7B. However, the disclosure is not limited thereto. It should be further elaborated that the aforementioned XZ plane is a plane defined by the X direction and the Z direction. The aforementioned YZ plane is a plane defined by the Y direction and the Z direction. The X direction and the Y direction are perpendicular to each other and perpendicular to the optical axis I direction, and a Z direction is parallel to the optical axis I direction.

It should also be elaborated that the surface form of the lens in the optical lens assembly 10 is a customized curved surface. Specifically, the surfaces of the lens element are lens having different aspherical coefficients in the X direction and the Y direction, wherein the aspherical coefficients in the X direction and the Y direction include radius of curvature, cone coefficient, and high-order aspherical coefficients. However, the disclosure applies optical software such as Zemax and CodeV to have different definitions of these lens surfaces in the X direction and Y direction, so as to adjust and monitor the optical performance of these surfaces for different directions of the beam. An effect of the plurality of linear spots parallel to each other may be generated by a row of a plurality of light sources in a parallel arrangement passing through the optical assembly 10, wherein a cylindrical definition and a cylinder definition of the optical software Code V or the optical software Zemax is a subset of the customized surfaces.

In this embodiment, the filter 2 is disposed between the aperture 1 and the light output side A1. The filter 2 may filter stray lights and help the near-infrared lights to pass through. When the near-infrared light sources 15a in a parallel arrangement along the X direction are emitted from the light emitting reference plane 100a of the structured light generating unit 15 having a plurality of light sources into the optical lens assembly 10, and the plurality of beams are generated sequentially, passing through the third lens element 6, the second lens element 5, the first lens element 4, the aperture 1, and the filter 2, and emitting out of the optical lens assembly 10. When the light beams emit on a plane perpendicular to the optical axis I of the light output side A1, a plurality of linear spots extending along the Y direction are generated, and the linear spots are arranged along the X direction.

The first lens element 4 is arranged to be a lens element having refracting power in a first order from the light output side A1 to the light input side A2. The first lens element 4 has positive refracting power. An optical axis region 451 of the light output surface 45 of the first lens element 4 is a convex, and a periphery region 453 is convex. An optical axis region 462 of the light input surface 46 of the first lens element 4 is concave, and a periphery region 463 is convex. In this embodiment, both of the light output surface 45 and the light input surface 46 of the first lens element 4 are aspheric surfaces.

The second lens element 5 is arranged to be a lens element having refracting power in a second order from the light input side A2 to the light output side A1. The second lens element 5 has positive refracting power. An optical axis region 552 of the light output surface 55 of the second lens element 5 is concave, and a periphery region 554 is concave. An optical axis region 561 of the input surface 56 of the second lens element 5 is convex, and a periphery region 563 is convex. In this embodiment, both of the light output surface 55 and the light input surface 56 of the second lens element 5 are aspheric surfaces.

The third lens element 6 is arranged to be a lens element having refracting power in a first order from the light input side A2 to the light output side A1. The third lens element 6 has positive refracting power. An optical axis region 652 of the light output surface 65 of the third lens element 6 is concave, and a periphery region 654 is concave. An optical axis region 661 of the input surface 66 of the third lens element 6 is convex, and a periphery region 663 is convex. In this embodiment, both of the light output surface 65 and the light input surface 66 of the third lens element 6 are aspheric surfaces.

Other detailed optical data of the first embodiment are illustrated in FIG. 9. In addition, the effective focal length of the optical lens assembly 10 of the first embodiment is 2.729 mm. SL is 4.205 mm. TTL is 3.605 mm. The image height is 0.450 mm and the HFOV is 9.371°. The Fno is 2.155. SL is the distance from an optical surface (that is, a light output surface 25 of the filter 2 of this embodiment) of one of optical elements closest to the light output side A1 of the optical lens assembly 10 to the structured light generating unit 15 having the plurality of light sources along the optical axis I. In addition, TTL is a distance from the light output surface 45 of the first lens element 4 to the structured light generating unit 15 having the plurality of light sources along the optical axis I. The radius of the light output surfaces 45, 55, 65 and the light input surfaces 46, 56, 66 of the first lens element 4, the second lens element 5, and the third lens element 6 in FIG. 9 indicates the radius in a plane parallel to the XZ plane. The radius of the light output surfaces 45, 55, 65 and the light input surfaces 46, 56, 66 of the first lens element 4, the second lens element 5, and the third lens element 6 parallel to the YZ plane are infinite.

Furthermore, in this embodiment, a total of six surfaces of the light output surfaces 45, 55, 65 and the light input surfaces 46, 56, 66 of the first lens element 4, the second lens element 5, and the third lens element 6 are common even asphere surface on the plane parallel to the XZ plane. These even asphere surfaces are defined by the following formulae:

$$Z(X) = \frac{X^2}{R} \bigg/ \left(1 + \sqrt{1-(1+K)\frac{X^2}{R^2}}\right) + \sum_{i=1}^{n} a_{2i} \times X^{2i} \tag{1}$$

wherein:

Z indicates aspherical depth (a vertical distance between a point of the aspherical surface, which is separated from the optical axis by a distance X, and a tangent plane of a vertex of the aspherical surface along the optical axis);

X indicates a vertical distance between a point on an aspherical surface and the optical axis;

R indicates a radius of curvature of lens surface;

K indicates a conic constant;

$a_{2i}$ is a 2i aspherical coefficient.

The aspherical coefficients of the light output surface 45 of the first lens element 4 through the light input surface 66 of the third lens element 6 in the equation (1) are illustrated in FIG. 10. Specifically, the field number 45 of FIG. 10 indicates the aspherical coefficients of the light output surface 45 of the first lens element 4, and so on.

Furthermore, respective crucial parameters and values of the correlation of the optical lens assembly 10 of the first embodiment are illustrated in FIG. 47 and FIG. 48. In FIG. 47, the unit of the parameters of T1 to AAG is mm.

wherein:

T1 is a thickness of the first lens element 4 along the optical axis I;

G12 is a distance from the light input surface 46 of the first lens element 4 to the light output surface 55 of the second lens element 5 along the optical axis I;

T2 is a thickness of the second lens element 5 along the optical axis I;

G23 is a distance from the light input surface 56 of the second lens element 5 to the light output 65 of the third lens element 6 along the optical axis I;

T3 is a thickness of the third lens element 6 along the optical axis I; TTL is a distance from the light output surface 45 of the first lens element 4 to structured light generating unit 15 having the plurality of light sources along the optical axis I;

SL is the distance from an optical surface of one of optical elements closest to the light output side A1 of the optical lens assembly 10 to the structured light generating unit 15 having the plurality of light sources along the optical axis I, that is, an effective length of the optical lens assembly;

BFL is a distance from the light input surface 66 of the third lens element 6 to the structured light generating unit 15 having the plurality of light sources along the optical axis I;

EFL is an effective focal length of the optical lens assembly;

TL is a distance from the light output surface 45 of the first lens element 4 to the light input surface 66 of the third lens element 6 along the optical axis I;

ALT is the sum of lens thicknesses of the lens elements having refracting power of the optical lens assembly 10 along the optical axis I;

AAG is the sum of the air gaps between all lens elements having refracting power of the optical lens assembly 10 along the optical axis I. It should be further noted that, in this embodiment, the optical surface of the optical element closest to the light output side A1 is the light output surface 25 of the filter 2. Therefore, SL is the distance from a light output surface 25 of the filter 2 to the structured light generating unit 15 having the plurality of light sources along the optical axis I. However, the disclosure is not limited thereto. For example, in some embodiments, when the optical element closest to the light output side A1 is the aperture 1, SL is the distance from the aperture 1 to the structured light generating unit 15 having the plurality of light sources on the optical axis I.

Figure 8A:
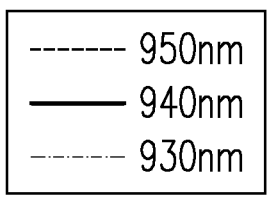
FIG. 8A to FIG. 8D are diagrams illustrating a longitudinal spherical aberration and various aberrations of the optical lens assembly according to the first embodiment.
Figure 8B:
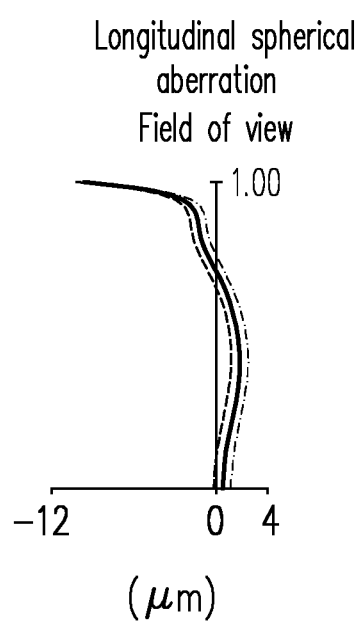
Figure 8C:
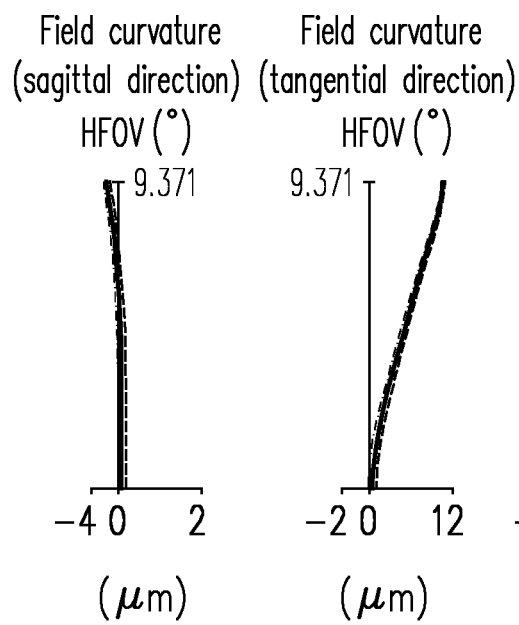
Figure 8D:
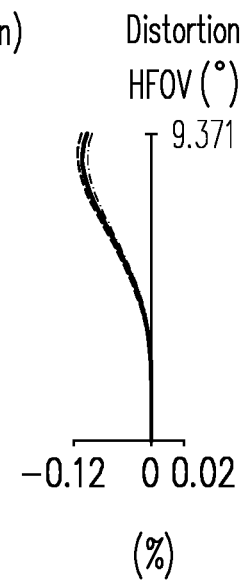

Please further refer to FIG. 8A to FIG. 8D. FIG. 8A is a diagram illustrating the longitudinal spherical aberration of the first embodiment when the pupil radius is 0.6332 mm. FIG. 8B and FIG. 8C respectively illustrate the first embodiment when the wavelength is 950 nm, 940 nm, and 930 nm on the sagittal direction and the field curvature aberration on the tangential direction on the light emitting reference plane 100a. FIG. 8D illustrates the first embodiment when the wavelength is 950 nm, 940 nm, and 930 nm, a distortion aberration occurs on the light emitting reference plane 100a. In the longitudinal spherical aberration of the first embodiment of FIG. 8A, the curves formed by wavelengths are very close and are close to the middle, which illustrates off-axis rays of different wavelengths are concentrated near the imaging point. It can be seen from the deflection amplitude of the curve of each wavelength that deviations of the imaging points of the off-axis rays at different heights are controlled in a range of within ±12 μm. Therefore, the first embodiment indeed obviously improves the spherical aberration of the same wavelength. In addition, the distances between the three representative wavelengths are also quite close to each other, which represents the image forming positions of the different wavelengths of light are quite concentrated. Thus, the chromatic aberration has been also significantly improved.

In the two field curvature aberration diagrams of FIG. 8B and FIG. 8C, the focal length variations of the three representative wavelengths of the entire field of view fall within ±12 μm, illustrating the optical system of the first embodiment may effectively eliminate aberrations. The distortion aberration drawing of FIG. 8D illustrates that the distortion aberration of the first embodiment is maintained in a range of ±0.12%, illustrating that the distortion aberration of the first embodiment is compliant with the imaging quality of the optical system. Accordingly, compared with the existing optical lens assembly, the first embodiment provides good imaging quality under the condition that the effective length has been shortened to around 4.205 mm.

The optical lens assembly 10 of the first embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0111 mm. When the temperature is raised to 60° C., the focal shift of the optical lens assembly 10 is 0.0251 mm. Therefore, compared with the existing optical lens assembly, the first embodiment has good thermal stability under the condition that the effective length has been shortened to around 4.205 mm.

FIG. 11 is a cross-sectional schematic view of an optical lens assembly on a plane parallel to the XZ plane according to the second embodiment of the disclosure. FIG. 12A to FIG. 12D are diagrams illustrating a longitudinal spherical aberration and various aberrations of the optical lens assembly according to the second embodiment. Please refer to FIG. 11 first. A second embodiment of the optical lens assembly 10 of this disclosure is generally similar to that of the first embodiment. The differences of the two are listed below: in the second embodiment, an optical axis region 461 of the light input surface 46 of the first lens element 4 is convex, and each of the optical data, the aspherical coefficients, and the parameters between the lens elements 4, 5, and 6 are more or less different. It should be noted that, for clarity, the reference numerals of some optical axis regions and periphery regions the same as those of the first embodiment are omitted from FIG. 11.

Detailed optical data of the optical lens assembly 10 of the second embodiment is illustrated in FIG. 13. In the second embodiment, the effective focal length of the optical lens assembly 10 is 2.729 mm. SL is 4.092 mm. TTL is 3.492 mm. The image height is 0.500 mm. HFOV is 10.387°, and the Fno is 2.155. The radius of the light output surfaces 45, 55, 65 and the light input surfaces 46, 56, 66 of the first lens element 4, the second lens element 5, and the third lens element 6 in FIG. 13 indicates the radius in a plane parallel to the XZ plane. The radius of the light output surfaces 45, 55, 65 and the light input surfaces 46, 56, 66 of the first lens element 4, the second lens element 5, and the third lens element 6 parallel to the YZ plane are infinite.

The aspherical coefficients of the output surface 45 of the first lens element 4 through the light input surface 66 of the third lens element 6 in the equation (1) according to the second embodiment are illustrated in FIG. 14.

Furthermore, respective crucial parameters and values of the correlation of the optical lens assembly 10 of the second embodiment are illustrated in FIGS. 47 and 48.

In the second embodiment, in the longitudinal spherical aberration of FIG. 12A, when pupil radius is 0.6330 mm, deviations of the imaging points of the off-axis rays at different heights are controlled in a range of within ±14 μm. In the two field curvature aberration diagrams of FIGS. 12B and 12C, the focal length variations of the three representative wavelengths of the entire field of view falls within ±18 μm. The distortion aberration diagram of FIG. 12D illustrates that the distortion aberration of the second embodiment is maintained in a range of ±0.12%.

The optical lens assembly 10 of the second embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0112 mm. When the temperature is raised to 60° C., the focal shift of the optical lens assembly 10 is 0.0243 mm.

It is known from the above descriptions that the effective length of the second embodiment is shorter than the effective length of the first embodiment. The HFOV of second embodiment is greater than the HFOV of the first embodiment. The field curvature aberration of the second embodiment is superior to the field curvature aberration of the first embodiment, and the thermal stability of the second embodiment is superior to thermal stability of the first embodiment.

FIG. 15 is a cross-sectional schematic view of an optical lens assembly on a plane parallel to the XZ plane according to the third embodiment of the disclosure. In addition, FIG. 16A to FIG. 16D are diagrams illustrating a longitudinal spherical aberration and various aberrations of the optical lens assembly according to the third embodiment. Please refer to FIG. 15 first. The third embodiment of the optical lens assembly 10 of this disclosure is generally similar to that of the first embodiment. The differences of the two are listed below: in the third embodiment, the optical axis region 461 of the light input surface 46 of the first lens element 4 is convex. The light input surface 66 of the third lens element 6 is spherical. Each of the optical data, the aspherical coefficients, and the parameters between the lens elements 4, 5, and 6 are more or less different. It should be noted that, for clarity, the reference numerals of some optical axis regions and periphery regions the same as those of the first embodiment are omitted from FIG. 15.

Detailed optical data of the optical lens assembly 10 of the third embodiment are illustrated in FIG. 17, and in the third embodiment, the effective focal length of the optical lens assembly 10 is 2.729 mm. SL is 4.729 mm. TTL is 3.621 mm. The image height is 0.430 mm. The HFOV is 8.961°, and the Fno is 2.155. The radius of the light output surfaces 45, 55, 65 and the light input surfaces 46, 56, 66 of the first lens element 4, the second lens element 5, and the third lens element 6 in FIG. 17 indicates the radius in a plane parallel to the XZ plane. The radius of the light output surfaces 45, 55, 65 and the light input surfaces 46, 56, 66 of the first lens element 4, the second lens element 5, and the third lens element 6 parallel to the YZ plane are infinite.

The aspherical coefficients of the output surface 45 of the first lens element 4 through the light output surface 65 of the third lens element 6 in the equation (1) according to the third embodiment are illustrated in FIG. 18.

Furthermore, respective crucial parameters and values of the correlation of the optical lens assembly 10 of the second embodiment are illustrated in FIGS. 47 and 48.

In the third embodiment, in the longitudinal spherical aberration of FIG. 16A, when pupil radius is 0.6332 mm, deviations of the imaging points of the off-axis rays at different heights are controlled in a range of within ±16 μm. In the two field curvature aberration diagrams of FIG. 16B and FIG. 16C, the focal length variations of the three representative wavelengths of the entire field of view falls within ±20 μm. The distortion aberration diagram of FIG. 16D illustrates that the distortion aberration of the third embodiment is maintained in a range of ±0.12%.

The optical lens assembly 10 of the third embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0127 mm. When the temperature is raised to 60° C., the focal shift of the optical lens assembly 10 is 0.0284 mm.

FIG. 19 is a cross-sectional schematic view of an optical lens assembly on a plane parallel to the XZ plane according to the fourth embodiment of the disclosure. Please refer to FIG. 19 first. The fourth embodiment of the optical lens assembly 10 of this disclosure is generally similar to that of the first embodiment. The differences of the two are listed below: the light input surface 66 of the third lens element 6 is a spherical surface, and each of the optical data, the aspherical coefficients, and the parameters between the lens elements 4, 5, and 6 are more or less different. It should be noted that, for clarity, the reference numerals of some optical axis regions and periphery regions the same as those of the first embodiment are omitted from FIG. 19.

Detailed optical data of the optical lens assembly 10 of the fourth embodiment is illustrated in FIG. 21. In the fourth embodiment, the effective focal length of the optical lens assembly 10 is 2.729 mm. SL is 4.199 mm. TTL is 3.599 mm. The image height is 0.380 mm. The HFOV is 7.934°, and the Fno is 2.155. The radius of the light output surfaces 45, 55, 65 and the light input surfaces 46, 56, 66 of the first lens element 4, the second lens element 5, and the third lens element 6 in FIG. 21 indicates the radius in a plane parallel to the XZ plane. The radius of the light output surfaces 45, 55, 65 and the light input surfaces 46, 56, 66 of the first lens element 4, the second lens element 5, and the third lens element 6 parallel to the YZ plane are infinite.

The aspherical coefficients of the output surface 45 of the first lens element 4 through the light output surface 65 of the third lens element 6 in the equation (1) according to the fourth embodiment are illustrated in FIG. 22.

Furthermore, respective crucial parameters and values of the correlation of the optical lens assembly 10 of the second embodiment are illustrated in FIGS. 47 and 48.

In the fourth embodiment, in the longitudinal spherical aberration of FIG. 20A, when pupil radius is 0.6332 mm, deviations of the imaging points of the off-axis rays at different heights are controlled in a range of within ±16 μm. In the two field curvature aberration diagrams of FIG. 20B and FIG. 20C, the focal length variations of the three representative wavelengths of the entire field of view falls within ±10 μm. The diagram of distortion aberration of FIG. 20D illustrates that the distortion aberration of the fourth embodiment is maintained in a range of ±0.14%.

The optical lens assembly 10 of the third embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0123 mm. When the temperature is raised to 60° C., the focal shift of the optical lens assembly 10 is 0.0247 mm.

It is known from the above descriptions that the effective length of the fourth embodiment is shorter than the effective length of the first embodiment. The field curvature aberration of the fourth embodiment is superior to the field curvature aberration of the first embodiment, and the thermal stability of the fourth embodiment is superior to thermal stability of the first embodiment.

FIG. 23 is a cross-sectional schematic view of an optical lens assembly on a plane parallel to the XZ plane according to the fifth embodiment of the disclosure. FIG. 24A to FIG. 24D are diagrams illustrating a longitudinal spherical aberration and various aberrations of the optical lens assembly according to the fifth embodiment. Please first refer to FIG. 23. The optical lens assembly 10 of the fifth embodiment of the present disclosure is mainly composed of four lens elements. In this embodiment, the optical lens assembly 10 includes the aperture 1, the first lens element 4, the fourth lens element 7, the second lens element 5 and the third lens element 6 arranged in a sequence from the light output side A1 to the light input side A2 along the optical axis I The first lens element 4, the fourth lens element 7, the second lens element 5, and the third lens element 6 are all cylindrical lens element, and each has light output surfaces 45, 75, 55, 65, facing the light output side A1 and allowing the plurality of infrared light sources passing through, and light input surfaces 46, 76, 56, 66, facing the light input side A2 and allowing the plurality of infrared light sources passing through. It should be further elaborated that the light input side A2 is a side facing the structured light generating unit having a plurality of light sources 15, and the opposite side is the light output side A1.

In detail, in this embodiment, the curvature of cross-sectional lines on a plane including the optical axis and parallel to an XZ plane of the light input surfaces 46, 76, 56, and 66 and the light output surfaces 45, 75, 55, and 65 of the first lens element 4, the forth lens element 7, the second lens element 5, and the third lens element 6 are respectively different from the curvature of cross-sectional lines on a plane including the optical axis and parallel to the YZ plane of the light input surfaces 46, 76, 56, and 66 and the light output surfaces 45, 75, 55, and 65 of the first lens element 4, the forth lens element 7, the second lens element 5, and the third lens element 6. To be more specific, in this embodiment, the curvature of cross-sectional lines on a plane including the optical axis and parallel to the YZ plane of the light input surfaces 46, 76, 56, and 66 and the light output surfaces 45, 75, 55, and 65 of the first lens element 4, the fourth lens element 7, the second lens element 5, and the third lens element 6 are straight lines. However, the disclosure is not limited thereto. It should be further elaborated that the aforementioned XZ plane is a plane defined by the X direction and the Z direction. The aforementioned YZ plane is a plane defined by the Y direction and the Z direction. The X direction and the Y direction are perpendicular to each other and perpendicular to the optical axis I direction, and the Z direction is parallel to the optical axis I direction.

When the plurality of near-infrared light sources 15a in a parallel arrangement along the X direction emits from the structured light generating unit 15 having a plurality of light sources into the optical lens assembly 10, and the plurality of beams are generated sequentially passing through the third lens element 6, the second lens element 5, the fourth lens element 7, the first lens element 4, and the aperture 1, and emit out of the optical lens assembly 10. When the light sources emit on a plane perpendicular to the optical axis I of the light output side A1, a plurality of linear spots extending along the Y direction are generated, and the linear spots are arranged along the X direction.

The first lens element 4 is arranged to be a lens element having refracting power in a first order from the light output side A1 to the light input side A2. The first lens element 4 has positive refracting power. An optical axis region 451 of the light output surface 45 of the first lens element 4 is convex, and a periphery region 453 is convex. The optical axis region 462 of the light input surface 46 of the first lens element 4 is concave, and a periphery region 464 is concave. In this embodiment, both of the light output surface 45 and the light input surface 46 of the first lens element 4 are aspheric surfaces.

The second lens element 5 is arranged to be a lens element having refracting power in a second order from the light input side A2 to the light output side A1. The second lens element 5 has negative refracting power. An optical axis region 552 of the light output surface 55 of the second lens element 5 is concave, and a periphery region 554 is convex. An optical axis region 561 of the input surface 56 of the second lens element 5 is convex, and a periphery region 563 is convex. In this embodiment, the output surface 55 and the input surface 56 of the second lens element 5 are both aspheric surfaces.

The third lens element 6 is arranged to be a lens element having refracting power in a first order from the light input side A2 to the light output side A1. The third lens element 6 has positive refracting power. An optical axis region 652 of the light output surface 65 of the third lens element 6 is concave, and a periphery region 654 is concave. An optical axis region 661 of the input surface 66 of the third lens element 6 is convex, and a periphery region 663 is convex. In this embodiment, both of the light output surface 65 and the light input surface 66 of the third lens element 6 are spheric surfaces.

The fourth lens element 7 has positive refracting power. An optical axis region 752 of the light output surface 75 of the fourth lens element 7 is concave, and a periphery region 754 is concave. An optical axis region 761 of the input surface 76 of the fourth lens element 7 is convex, and a periphery region 763 is convex. In this embodiment, the output surface 75 and the input surface 76 of the fourth lens element 7 are both aspheric surfaces. Therefore, it may be defined by the above formula (1).

Other detailed optical data of the optical lens assembly 10 of the fifth embodiment are illustrated in FIG. 25. In addition, the overall effective focal length of the optical lens assembly 10 of the fifth embodiment is 2.899 mm. SL is 3.659 mm. TTL is 3.358 mm. The image height is 0.250 mm and the HFOV is 4.930°. The Fno is 2.096. In this embodiment, SL is the distance from the aperture 1 to the structured light generating unit 15 having the plurality of light sources along the optical axis I. The radius of the light output surfaces 45, 55, 65, 75 and the light input surfaces 46, 56, 66, 76 of the first lens element 4, the second lens element 5, the third lens element 6, and the fourth lens element 7 in FIG. 25 indicates the radius in a plane parallel to the XZ plane. The radius of the light output surfaces 45, 55, 65, 75 and the light input surfaces 46, 56, 66, 76 of the first lens element 4, the second lens element 5, the third lens element 6, and the fourth lens element 7 parallel to the YZ plane are infinite.

The aspherical coefficients of the light output surface 45 of the first lens element 4 through the light input surface 56 of the second lens element 5 in the equation (1) are illustrated in FIG. 26. Specifically, the field number 45 of FIG.

26 indicates the aspherical coefficients of the light output surface 45 of the first lens element 4, and so on.

Furthermore, respective crucial parameters and values of the correlation of the optical lens assembly 10 of the fifth embodiment are illustrated in FIGS. 49 and 50. In FIG. 49, the unit of the parameters of T1 to AAG is mm.

Part of the parameter definitions are the same as those in FIG. 47. In addition, G14 is a distance from the light input surface 46 of the first lens element 4 to the light output surface 75 of the fourth lens element 4 along the optical axis I;

T4 is a thickness of the fourth lens element 7 along the optical axis I; G42 is a distance from the light input surface 76 of the fourth lens element 7 to the light output surface 55 of the second lens element 5 along the optical axis I.

Please further refer to FIG. 24A to FIG. 24D. In the fifth embodiment, in the longitudinal spherical aberration of FIG. 24A, when pupil radius is 0.6913 mm, deviations of the imaging points of the off-axis rays at different heights are controlled in a range of within ±16 µm. In the two field curvature aberration diagrams of FIGS. 24B and 24C, the focal length variations of the three representative wavelengths of the entire field of view falls within ±25 µm. The diagram of distortion aberration of FIG. 24D illustrates that the distortion aberration of the fifth embodiment is maintained in a range of ±0.4%.

The optical lens assembly 10 of the fifth embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0139 mm. When the temperature is raised to 60° C., the focal shift of the optical lens assembly 10 is 0.0282 mm.

It is known from the above descriptions that the effective length of the fifth embodiment is shorter than the effective length of the first embodiment. The Fno of the fifth embodiment is smaller than the Fno of the first embodiment.

FIG. 27 is a cross-sectional schematic view of an optical lens assembly on a plane parallel to the XZ plane according to the sixth embodiment of the disclosure. FIG. 28A to FIG. 28D are diagrams illustrating a longitudinal spherical aberration and various aberrations of the optical lens assembly according to the sixth embodiment. Please refer to FIG. 27 first. A sixth embodiment of the optical lens assembly 10 of this disclosure is generally similar to that of the fifth embodiment. The differences between the two are listed below: in the sixth embodiment, an optical axis region 461 of the light input surface 46 of the first lens element 4 is convex, and a periphery region 463 is convex. Each of the optical data, the aspherical coefficients, and the parameters between the lens elements 4, 5, 6, and 7 are more or less different. It should be noted that, for clarity, the reference numerals of some optical axis regions and periphery regions the same as those of the fifth embodiment are omitted from FIG. 27.

Furthermore, in the sixth embodiment, the first lens element 4 is made of glass. Therefore, thermal stability may be improved to reduce the amount of focal shift, and a certain optical quality may be maintained in the optical lens assembly 10 in an environment of different temperatures.

Detailed optical data of the optical lens assembly 10 of the sixth embodiment are illustrated in FIG. 29. In addition, the effective focal length of the optical lens assembly 10 of the six embodiment is 2.899 mm. SL is 4.111 mm. TTL is 3.757 mm. The image height is 0.260 mm and the HFOV is 5.130°. The Fno is 2.096. The radius of the light output surfaces 45, 55, 65, 75 and the light input surfaces 46, 56, 66, 76 of the first lens element 4, the second lens element 5, the third lens element 6, and the fourth lens element 7 in FIG. 29 indicates the radius in a plane parallel to the XZ plane. The radius of the light output surfaces 45, 55, 65, 75 and the light input surfaces 46, 56, 66, 76 of the first lens element 4, the second lens element 5, the third lens element 6, and the fourth lens element 7 parallel to the YZ plane are infinite.

The aspherical coefficients of the light output surface 56 of the first lens element 4 through the light input surface 56 of the second lens element 5 in the equation (1) are illustrated in FIG. 30.

Furthermore, respective crucial parameters and values of the correlation of the optical lens assembly 10 of the sixth embodiment are illustrated in FIGS. 49 and 50.

In the sixth embodiment, in the longitudinal spherical aberration of FIG. 28A, when pupil radius is 0.6915 mm, deviations of the imaging points of the off-axis rays at different heights are controlled in a range of within ±25 µm. In the two field curvature aberration diagrams of FIGS. 28B and 28C, the focal length variations of the three representative wavelengths of the entire field of view falls within ±18 µm. The diagram of distortion aberration of FIG. 28D illustrates that the distortion aberration of the sixth embodiment is maintained in a range of ±0.12%.

The optical lens assembly 10 of the sixth embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is 0.0038 mm. When the temperature is raised to 60° C., the focal shift of the optical lens assembly 10 is −0.0077 mm.

It is known from the above descriptions that the effective length of the sixth embodiment is shorter than the effective length of the first embodiment. The Fno of the sixth embodiment is smaller than the Fno of the first embodiment, and the thermal stability of the sixth embodiment is superior to thermal stability of the first embodiment.

FIG. 31 is a cross-sectional schematic view of an optical lens assembly on a plane parallel to the XZ plane according to the seventh embodiment of the disclosure. FIG. 32A to FIG. 32D are diagrams illustrating a longitudinal spherical aberration and various aberrations of the optical lens assembly according to the seventh embodiment. Please refer to FIG. 31 first. The seventh embodiment of the optical lens assembly 10 of this disclosure is generally similar to that of the fifth embodiment. The differences of the two are listed below: the optical lens assembly 10 of the seventh embodiment further includes the two filters 2 and 3, the aperture 1, two filters 2 and 3, the first lens element 4, the fourth lens element 7, the second lens element 5, the third lens element 6 arranged in a sequence from the light output side A1 to the light input side A2 along the optical axis I. The light output surface 46 of the first lens element 4 is a spheric surface. An optical axis region 751 of the light output surface 75 of the fourth lens element 4 is convex, and a periphery region 753 is convex. The optical axis region 762 of the light input surface 76 of the fourth lens element 7 is concave, and a periphery region 764 is concave. Both of the light output surface 65 and the light input surface 66 of the third lens element 6 are aspheric surfaces. In addition, each of the optical data, the aspherical coefficients, and the parameters between the lens elements 4, 5, 6, and 7 are more or less different. It should be noted that, for clarity, the reference numerals of some optical axis regions and periphery regions the same as those of the fifth embodiment are omitted from FIG. 31.

Detailed optical data of the optical lens assembly 10 of the seventh embodiment are illustrated in FIG. 33. In addition, the effective focal length of the optical lens assembly 10 of the seventh embodiment is 2.686 mm. SL is 3.568 mm. TTL is 2.868 mm. The image height is 0.380 mm and the HFOV is 8.050°. The Fno is 2.155. The radius of the light output surfaces 45, 55, 65, 75 and the light input surfaces 46, 56, 66, 76 of the first lens element 4, the second lens element 5, the third lens element 6, and the fourth lens element 7 in FIG. 33 indicate the radius of in a plane parallel to the XZ plane. The radius of the light output surfaces 45, 55, 65, 75 and the light input surfaces 46, 56, 66, 76 of the first lens element 4, the second lens element 5, the third lens element 6, and the fourth lens element 7 parallel to the YZ plane are infinite.

The aspherical coefficients of the output surface 45 of the first lens element 4 through the light input surface 66 of the third lens element 6 in the equation (1) according to the seventh embodiment are illustrated in FIG. 34.

Furthermore, respective crucial parameters and values of the correlation of the optical lens assembly 10 of the seventh embodiment are illustrated in FIGS. 49 and 50.

In the seventh embodiment, in the longitudinal spherical aberration of FIG. 32A, when pupil radius is 0.6230 mm, deviations of the imaging points of the off-axis rays at different heights are controlled in a range of within ±2.5 μm. In the two field curvature aberration diagrams of FIG. 32B and FIG. 32C, the focal length variations of the three representative wavelengths of the entire field of view falls within ±14 μm. The diagram of distortion aberration of FIG. 32D illustrates that the distortion aberration of the seventh embodiment is maintained in a range of ±0.014%.

The optical lens assembly 10 of the seventh embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0106 mm. When the temperature is raised to 60° C., the focal shift of the optical lens assembly 10 is 0.0220 mm.

It is known from the above descriptions that the effective length of the seventh embodiment is shorter than the effective length of the first embodiment. The longitudinal spherical aberration of the seventh embodiment is superior to the longitudinal spherical aberration of the first embodiment, The distortion aberration of the seventh embodiment is superior to the distortion aberration of the first embodiment, and the thermal stability of the seventh embodiment is superior to thermal stability of the first embodiment.

FIG. 35 is a cross-sectional schematic view of an optical lens assembly on a plane parallel to an XZ plane according to the eighth embodiment of the disclosure. FIG. 36A to FIG. 36D are diagrams illustrating a longitudinal spherical aberration and various aberrations of the optical lens assembly according to the eighth embodiment. Please refer to FIG. 35 first. The eighth embodiment of the optical lens assembly 10 of this disclosure is generally similar to that of the fifth embodiment. The differences of the two are listed below: the optical lens assembly 10 of the eighth embodiment further includes the two filters 2 and 3, and the aperture 1, two filters 2 and 3, the first lens element 4, the fourth lens element 7, the second lens element 5, the third lens element 6 are arranged along the optical axis I in a sequence from the light output side A1 to the light input side A2 along the optical axis I. The light input surface 46 of the first lens element 4 is a spheric surface. The fourth lens element 7 has negative refracting power, and an optical axis region 751 of the light output surface 75 of the fourth lens element 7 is convex, and a periphery region 753 is convex. The optical axis region 762 of the light input surface 76 is concave, and a periphery region 764 is concave. Both of the light output surface 65 and the light input surface 66 of the third lens element 6 are aspheric surfaces. In addition, each of the optical data, the aspherical coefficients, and the parameters between the lens elements 4, 5, 6, and 7 are more or less different. It should be noted that, for clarity, the reference numerals of some optical axis regions and periphery regions the same as those of the fifth embodiment are omitted from FIG. 35.

Furthermore, in the eighth embodiment, the first lens element 4 is made of glass. Therefore, thermal stability may be improved to reduce the amount of focal shift, and a certain optical quality may be maintained in the optical lens assembly 10 in an environment of different temperatures.

Detailed optical data of the optical lens assembly 10 of the eighth embodiment are illustrated in FIG. 37. In addition, the effective focal length of the optical lens assembly 10 of the eighth embodiment is 2.684 mm. SL is 3.394 mm. TTL is 2.694 mm. The image height is 0.400 mm and the HFOV is 8.480°. The Fno is 2.155. The radius of the light output surfaces 45, 55, 65, 75 and the light input surfaces 46, 56, 66, 76 of the first lens element 4, the second lens element 5, the third lens element 6, and the fourth lens element 7 in FIG. 37 indicates the radius in a plane parallel to the XZ plane. The radius of the light output surfaces 45, 55, 65, 75 and the light input surfaces 46, 56, 66, 76 of the first lens element 4, the second lens element 5, the third lens element 6, and the fourth lens element 7 parallel to the YZ plane are infinite.

The aspherical coefficients of the light output surface 45 of the first lens element 4 through the light input surface 66 of the third lens element 6 in the equation (1) are illustrated in FIG. 38.

Furthermore, respective crucial parameters and values of the correlation of the optical lens assembly 10 of the eighth embodiment are illustrated in FIGS. 49 and 50.

In the eighth embodiment, in the longitudinal spherical aberration of FIG. 36A, when pupil radius is 0.6226 mm, deviations of the imaging points of the off-axis rays at different heights are controlled in a range of within ±2.5 μm. In the two field curvature aberration diagrams of FIGS. 36B and 36C, the focal length variations of the three representative wavelengths of the entire field of view falls within ±12 μm. The diagram of distortion aberration of FIG. 36D illustrates that the distortion aberration of the eighth embodiment is maintained in a range of ±0.014%.

The optical lens assembly 10 of the eighth embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is 0.0019 mm. When the temperature is raised to 60° C., the focal shift of the optical lens assembly 10 is −0.0033 mm.

It is known from the above descriptions that the effective length of the eighth embodiment is shorter than the effective length of the first embodiment. The longitudinal spherical aberration of eighth embodiment is superior to the longitudinal spherical aberration of the first embodiment. The distortion aberration of the eighth embodiment is superior to the distortion aberration of the first embodiment, and the thermal stability of the eighth embodiment is superior to thermal stability of the first embodiment.

FIG. 39 is a cross-sectional schematic view of an optical lens assembly on a plane parallel to an XZ plane according to the ninth embodiment of the disclosure. In addition, FIG. 40A to FIG. 40D are diagrams illustrating a longitudinal spherical aberration and various aberrations of the optical lens assembly according to the ninth embodiment. Please refer to FIG. 39 first. A ninth embodiment of the optical lens assembly 10 of this disclosure is generally similar to that of the fifth embodiment. The differences of the two are listed below: the optical lens assembly 10 of the ninth embodiment further includes the filter 2, and the aperture 1, the filter 2, the first lens element 4, the fourth lens element 7, the second lens element 5, and the third lens element 6 are arranged in a sequence from the light output side A1 to the light input side A2 along the optical axis I. The fourth lens element 4 of the ninth embodiment has negative refracting power. The second lens element 5 has positive refracting power. An optical axis region 751 of the light output surface 75 of the fourth lens element 4 is convex, and a periphery region 753 is a convex. The optical axis region 762 of the light input surface 76 is concave, and a periphery region 764 is concave. Both of the light output surface 65 and the light input surface 66 of the third lens element 6 are aspheric surfaces, and each of the optical data, the aspherical coefficients, and the parameters between the lens elements 4, 5, 6, and 7 are more or less different. It should be noted that, for clarity, the reference numerals of some optical axis regions and periphery regions the same as those of the fifth embodiment are omitted from FIG. 39.

Detailed optical data the optical lens assembly 10 of the ninth embodiment are illustrated in FIG. 41. In addition, the effective focal length of the optical lens assembly 10 of the ninth embodiment is 2.731 mm. SL is 3.445 mm. TTL is 2.855 mm. The image height is 0.430 mm and the half field of view angle is 8.942°. The Fno is 2.155. The radius of the light output surfaces 45, 55, 65, 75 and the light input surfaces 46, 56, 66, 76 of the first lens element 4, the second lens element 5, the third lens element 6, and the fourth lens element 7 in FIG. 41 indicates the radius in a plane parallel to the XZ plane. The radius of the light output surfaces 45, 55, 65, 75 and the light input surfaces 46, 56, 66, 76 of the first lens element 4, the second lens element 5, the third lens element 6, and the fourth lens element 7 parallel to the YZ plane are infinite.

The aspherical coefficients of the output surface 45 of the first lens element 4 through the light input surface 66 of the third lens element 6 in the equation (1) according to the ninth embodiment are illustrated in FIG. 42.

Furthermore, respective crucial parameters and values of the correlation of the optical lens assembly 10 of the ninth embodiment are illustrated in FIG. 49 and FIG. 50.

In the ninth embodiment, in the longitudinal spherical aberration of FIG. 40A, when pupil radius is 0.6335 mm, deviations of the imaging points of the off-axis rays at different heights are controlled in a range of within ±30 μm. In the two field curvature aberration diagrams of FIG. 40B and FIG. 40C, the focal length variations of the three representative wavelengths of the entire field of view falls within ±25 μm. The diagram of distortion aberration of FIG. 40D illustrates that the distortion aberration of the ninth embodiment is maintained in a range of ±0.05%.

The optical lens assembly 10 of the ninth embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0110 mm. When the temperature is raised to 60° C., the focal shift of the optical lens assembly 10 is 0.0181 mm.

It is known from the above descriptions that the effective length of the ninth embodiment is shorter than the effective length of the first embodiment. The distortion aberration of the ninth embodiment is superior to the distortion aberration of the first embodiment, and the thermal stability of the ninth embodiment is superior to thermal stability of the first embodiment.

FIG. 43 is a cross-sectional schematic view of an optical lens assembly on a plane parallel to an XZ plane according to the tenth embodiment of the disclosure. FIG. 44A to FIG. 44D are diagrams illustrating a longitudinal spherical aberration and various aberrations of the optical lens assembly according to the tenth embodiment. Please refer to FIG. 43 first. The optical lens assembly 10 of the tenth embodiment of this disclosure is generally similar to that of the fifth embodiment. The differences of the two are listed below: in the tenth embodiment, a periphery region 463 of the light input surface 46 of the first lens element 4 is convex. An optical axis region 551 of the light output surface 55 of the second lens element 5 is convex, the optical axis region 562 of the light input surface 56 is concave, and a periphery region 564 is a concave. In addition, each of the optical data, the aspherical coefficients, and the parameters between the lens elements 4, 5, 6, and 7 are more or less different. It should be noted that, for clarity, the reference numerals of some optical axis regions and periphery regions the same as those of the fifth embodiment are omitted from FIG. 43.

Other detailed optical data of the optical lens assembly 10 of the tenth embodiment are illustrated in FIG. 10. In addition, the effective focal length of the optical lens assembly 10 of the tenth embodiment is 2.900 mm. SL is 3.529 mm. TTL is 3.245 mm. The image height is 0.250 mm and the half field of view angle is 4.966°. The Fno is 2.096. The radius of the light output surfaces 45, 55, 65, 75 and the light input surfaces 46, 56, 66, 76 of the first lens element 4, the second lens element 5, the third lens element 6, and the fourth lens element 7 in FIG. 45 indicates the radius in a plane parallel to the XZ plane. The radius of the light output surfaces 45, 55, 65, 75 and the light input surfaces 46, 56, 66, 76 of the first lens element 4, the second lens element 5, the third lens element 6, and the fourth lens element 7 parallel to the YZ plane are infinite.

The aspherical coefficients of the light output surface 45 of the first lens element 4 through the light input surface 56 of the second lens element 5 in the equation (1) are illustrated in FIG. 46.

Furthermore, the relationship between crucial parameters of the optical lens assembly 10 of the tenth embodiment are illustrated in FIGS. 49 and 50.

In the tenth embodiment, in the longitudinal spherical aberration of FIG. 44A, when pupil radius is 0.6916 mm, deviations of the imaging points of the off-axis rays at different heights are controlled in a range of within ±3 μm. In the two field curvature aberration diagrams of FIGS. 44B and 44C, the focal length variations of the three representative wavelengths of the entire field of view falls within ±25 μm. The diagram of distortion aberration rate of FIG. 44D illustrates that the distortion aberration of the tenth embodiment is maintained in a range of ±0.12%.

The optical lens assembly 10 of the tenth embodiment has good thermal stability. The room temperature of 20° C. is set as a reference. At this temperature, the focal shift of the optical lens assembly 10 is 0.0000 mm. When the temperature is lowered to 0° C., the focal shift of the optical lens assembly 10 is −0.0156 mm. When the temperature is raised to 60° C., the focal shift of the optical lens assembly 10 is 0.0314 mm.

It is known from the above descriptions that the effective length of the tenth embodiment is shorter than the effective length of the first embodiment. The Fno of the tenth embodiment is smaller than the Fno of the first embodiment, and the longitudinal spherical aberration of tenth embodiment is superior to the longitudinal spherical aberration of the first embodiment.

To enable the design of the optical lens assembly 10 to meet the needs of smaller sized portable electronic devices, the optical assembly 10 may be compliant with SL/AAG≤6.500, which may help shorten effective length while maintain good imaging quality. The better scope is 2.200 SL/AAG 6.500.

In addition, in consideration of the difficulty of manufacturing, the air gap or the thickness of the lens element between the lens element may be appropriately adjusted. If the value of the following conditional is satisfied, it is possible to shorten the length of the lens element system, maintain good resolution, and maintain high manufacturing yield.

wherein:

the optical lens assembly 10 may be compliant with ALT/T1≤5.200, and the preferable range is 2.500≤ALT/T1≤5.200;

the optical lens assembly 10 may be compliant with TL/(T3+BFL)≤6.500, and the preferable range is 1.700≤TL/(T3+BFL)≤6.500;

the optical lens assembly 10 may be compliant with SL/EFL≤2.500, and the preferable range is 0.800≤SL/EFL≤2.500;

the optical lens assembly 10 may be compliant with EFL/(T1+T2)≤4.500, and the preferable range is 2.100≤EFL/(T1+T2)≤4.500;

the optical lens assembly 10 may be compliant with ALT/(G12+T2)≤2.500, and the preferable range is 0.600≤ALT/(G12+T2)≤2.500;

the optical lens assembly 10 may be compliant with TL/(G23+T3)≤12.000, and the preferable range is 2.000≤TL/(G23+T3)≤12.000;

the optical lens assembly 10 may be compliant with ALT/AAG≤3.500, and the preferable range is 1.100≤ALT/AAG≤3.500;

the optical lens assembly 10 may be compliant with (T1+T3)/T2≤5.200, and the preferable range is 1.700≤(T1+T3)/T2≤5.200;

the optical lens assembly 10 may be compliant with TTL/ALT≤2.800, and the preferable range is 1.400≤TTL/ALT≤2.800;

the optical lens assembly 10 may be compliant with SL/(T2+G23+T3)≤5.000, and the preferable range is 1.700≤SL/(T2+G23+T3)≤5.000;

the optical lens assembly 10 may be compliant with TL/(T1+G23)≤7.500, and the preferable range is 2.600≤TL/(T1+G23)≤7.500;

the optical lens assembly 10 may be compliant with (T1+G12+T2)/T3≤12.000, and the preferable range is 1.600≤(T1+G12+T2)/T3≤12.000;

the optical lens assembly 10 may be compliant with (G23+T3)/T1≤3.300, and the preferable range is 0.600≤(G23+T3)/T≤3.300;

the optical lens assembly 10 may be compliant with ALT/(T2+T3)≤3.600, and the preferable range is 1.200≤ALT/(T2+T3)≤3.600;

the optical lens assembly 10 may be compliant with (T1+BFL)/T2-4.100, and the preferable range is 1.100≤(T1+BFL)/T2≤4.100;

the optical lens assembly 10 may be compliant with AAG/T2≤6.000, and the preferable range is 1.300≤AAG/T2≤6.000;

the optical lens assembly 10 may be compliant with EFL/AAG≤4.300, and the preferable range is 1.700≤EFL/AAG≤4.300.

In addition, it is optional to select an arbitrary combination relationship of the parameter in the embodiment to increase limitation of the optical lens assembly for the ease of designing the optical imaging lens having the same structure in the disclosure. Due to the unpredictability in the design of an optical system, with the framework of the embodiments of the disclosure, under the circumstances where the above-described conditions are satisfied, the optical lens assembly according to the embodiments of the disclosure with shorter length, increased aperture, improved imaging quality, or better yield rate may be preferably achieved so as to improve the shortcoming of prior art.

The above-limited relation is provided in an exemplary sense and can be randomly and selectively combined and applied to the embodiments of the disclosure in different manners; the disclosure should not be limited to the above examples. In implementation of the disclosure, apart from the above-described relations, it is also possible to add additional detailed structure such as more concave and convex curvatures arrangement of a specific lens element or a plurality of lens elements so as to enhance control of system property and/or resolution. For instance, a convex surface located in the optical axis region may selectively be additionally formed on the object side surface of the first lens. It should be noted that the above-described details can be optionally combined and applied to the other embodiments of the disclosure under the condition where they are not in conflict with one another.

Based on the above, the optical lens assembly in the embodiment of the disclosure may achieve the following effects and advantages:

1. The light sources emitted from the plurality of near-infrared light sources of each embodiment of the disclosure through the optical lens assembly of the embodiment of this disclosure. The curvature of cross-sectional lines of the light input surfaces and the light output surfaces of the first lens element, the second lens element, and the third lens element on a plane containing the optical axis and parallel to the XZ plane are respectively different from the curvature of cross-section lines of the light input surface and the light output surface of the first lens element, the second lens element, and the third lens element on a plane containing the optical axis and parallel to the YZ plane. When the light sources emit on a plane perpendicular to the optical axis of the light output side, a plurality of linear spots extending along the Y direction are generated, and the linear spots are arranged along the X direction and have good resolution.

2. The cross-sectional lines of the light input surface and the light output surface of the first lens element, the light input surface and the light output surface of the second lens element, and the light input surface and the light output surface of the third lens element on a plane containing the optical axis and parallel to the YZ plane are all straight lines, and have better yield performance.

3. The third lens of each embodiment of the present disclosure has positive refracting power and the optical axis region of the light input surface of the third lens element is convex are capable of effectively collecting light. With the periphery region of the light output surface of the third lens element being concave, the periphery region of the light output surface of the second lens element being concave, and the optical axis region of the light output surface of the first lens element being convex, the aberration is corrected.

4. The aspherical design of the lens elements of each embodiment of the present disclosure is more advantageous for optimizing imaging quality.

5. The lens selection plastic material of each embodiment of the present disclosure contributes to weight reduction, wherein selecting one or more lens elements using a glass material helps to improve thermal stability and reduce focal shift.

6. The maximum and minimum numeral values derived from the combinations of the optical parameters disclosed in the embodiments of the disclosure may all be applicable and enable people skill in the pertinent art to implement the disclosure.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:

1. An optical lens assembly for generating a plurality of light beams from a plurality of near infrared light beams emitted by a structured light generating unit having a plurality of light sources and passed through the optical lens assembly, a side facing the structured light generating unit having the light sources being a light input side, another side opposite thereto being a light output side, the optical lens assembly comprising a first lens element, a second lens element and a third lens element arranged along an optical axis in a sequence from a light output side to a light input side, each of the first lens element, the second lens element and the third lens element comprising a light output surface facing the light output side and a light input surface facing the light input side;

wherein the first lens element is arranged to be a lens element having refracting power in a first order from the light output side to the light input side;

the second lens element is arranged to be a lens element having refracting power in a second order from the light input side to the light output side;

the third lens element is arranged to be a lens element having refracting power in a first order from the light input side to the light output side;

the curvature of a cross-sectional line of the light input surface and the light output surface of the first lens element, the light input surface and the light output surface of the second lens element, and the light input surface and the light output surface of the third lens element on a plane containing the optical axis and parallel to an XZ plane are respectively different from the curvature of a cross-sectional line of the light input surface and the light output surface of the first lens element, the light input surface and the light output surface of the second lens element, and the light input surface and the light output surface of the third lens element on a plane containing the optical axis and parallel to a YZ plane, wherein an X direction and a Y direction are perpendicular to each other and perpendicular to the optical axis, and a Z direction is parallel to the optical axis, and the XZ plane is defined by the X direction and the Y direction, and the YZ plane is defined by the Y direction and the Z direction; and the optical lens assembly satisfies: SL/AAG≤6.500, wherein SL is a distance from an optical surface of one of optical elements closest to the light output side of the optical lens assembly to the structured light generating unit having the plurality of light sources along the optical axis, and AAG is a sum of the air gaps among all lens elements having refracting power of the optical lens assembly along the optical axis.

2. The optical lens assembly according to claim 1, wherein cross-sectional lines of the light input surface and the light output surface of the first lens element, the light input surface and the light output surface of the second lens element, and the light input surface and the light output surface of the third lens element on a plane containing the optical axis parallel to the YZ plane are all straight lines.

3. The optical lens assembly according to claim 1, wherein at least one of the first lens element, the second lens element, and the third lens element is made of glass.

4. The optical lens assembly according to claim 1, wherein the optical lens assembly further satisfies to the following conditional formula: ALT/T1≤5.200, wherein ALT is a sum of thicknesses of all the lens elements having refracting power of the optical lens assembly along the optical axis, and T1 is a thickness of the first lens element along the optical axis.

5. The optical lens assembly according to claim 1, wherein the optical lens assembly further satisfies to the following conditional formula: TL/(T3+BFL)≤6.500, wherein TL is a distance from the light output surface of the first lens element to the light input surface of the third lens element along the optical axis, T3 is a thickness of the third lens element along the optical axis, and BFL is a distance from the light input surface of the third lens element to the structured light generating unit having a plurality of light sources along the optical axis.

6. The optical lens assembly according to claim 1, wherein the optical lens assembly further satisfies to the following conditional formula: SL/EFL≤2.500, wherein EFL is an effective focal length of the optical lens assembly.

7. The optical lens assembly according to claim 1, wherein the optical lens assembly further satisfies to the following conditional formula: EFL/(T1+T2)≤4.500, wherein EFL is an effective focal length of the optical lens assembly, T1 is a thickness of the first lens element along the optical axis, and T2 is a thickness of the second lens element along the optical axis.

8. The optical lens assembly according to claim 1, wherein the optical lens assembly further satisfies to the following conditional formula: ALT/(G12+T2)≤2.500, wherein ALT is a sum of thicknesses of all of the lens elements having refracting power of the optical lens assembly along the optical axis, and G12 is a distance from the light input surface of the first lens element to the light output surface of the second lens element along the optical axis, and T2 is a thickness of the second lens element along the optical axis.

9. The optical lens assembly according to claim 1, wherein the optical lens assembly further satisfies to the following conditional formula: TL/(G23+T3)≤12.000, wherein TL is a distance from the light output surface of the first lens element to the light input surface of the third lens element along the optical axis, G23 is a distance from the light input surface of the second lens element to the light output surface of the third lens element along the optical axis, and T3 is a thickness of the third lens element along the optical axis.

10. The optical lens assembly according to claim 1, wherein the optical lens assembly further satisfies to the following conditional formula: ALT/AAG≤3.500, wherein ALT is a sum of thicknesses of all of the lens elements having refracting power of the optical lens assembly along the optical axis.

11. The optical lens assembly according to claim 1, wherein the optical lens assembly further satisfies to the following conditional formula: (T1+T3)/T2≤5.200, wherein T1 is a thickness of the first lens element along the optical axis, T2 is a thickness of the second lens element along the optical axis, and T3 is a thickness of the third lens element along the optical axis.

12. The optical lens assembly according to claim 1, wherein the optical lens assembly further satisfies to the following conditional formula: TTL/ALT≤2.800, wherein TTL is a distance from the light output surface of the first lens element to the structured light generating unit having a plurality of light sources along the optical axis, and ALT is a sum of thicknesses of all of the lens elements having refracting power of the optical lens assembly along the optical axis.

13. The optical lens assembly according to claim 1, wherein the optical lens assembly further satisfies to the following conditional formula: SL/(T2+G23+T3)≤5.000, wherein T2 is a thickness of the second lens element along the optical axis, G23 is a distance from the light input surface of the second lens element to the light output surface of the third lens element along the optical axis, and T3 is a thickness of the third lens element along the optical axis.

14. The optical lens assembly according to claim 1, wherein the optical lens assembly further satisfies to the following conditional formula: TL/(T1+G23)≤7.500, wherein TL is a distance from the light output surface of the first lens element to the light input surface of the third lens element along the optical axis, T1 is a thickness of the first lens element along the optical axis, and G23 is a distance from the light input surface of the second lens element to the light output surface of the third lens element along the optical axis.

15. The optical lens assembly according to claim 1, wherein the optical lens assembly further satisfies the following conditional formula: (T1+G12+T2)/T3≤12.000, wherein T1 is a thickness of the first lens element along the optical axis, G12 is a distance from the light input surface of the first lens element to the light output surface of the second lens element along the optical axis, T2 is a thickness of the second lens element along the optical axis, and T3 is a thickness of the third lens element along the optical axis.

16. The optical lens assembly according to claim 1, wherein the optical lens assembly further satisfies to the following conditional formula: (G23+T3)/T1≤3.300, wherein G23 is a distance from the light input surface of the second lens element to the light output surface of the third lens element along the optical axis, T3 is a thickness of the third lens element along the optical axis, and T1 is a thickness of the first lens element along the optical axis.

17. The optical lens assembly according to claim 1, wherein the optical lens assembly further satisfies to the following conditional formula: ALT/(T2+T3)≤3.600, wherein ALT is a sum of thicknesses of all of the lens elements having refracting power of the optical lens assembly along the optical axis, T2 is a thickness of the second lens element along the optical axis, and T3 is a thickness of the third lens element along the optical axis.

18. The optical lens assembly according to claim 1, wherein the optical lens assembly further satisfies to the following conditional formula: (T1+BFL)/T2≤4.100, wherein T1 is a thickness of the first lens element along the optical axis, BFL is a distance from the light input surface of the third lens element to the structured light generating unit having a plurality of light sources along the optical axis, and T2 is a thickness of the second lens element along the optical axis.

19. The optical lens assembly according to claim 1, wherein the optical lens assembly further satisfies to the following conditional formula: AAG/T2≤6.000, wherein T2 is a thickness of the second lens element along the optical axis.

20. The optical lens assembly according to claim 1, wherein the optical lens assembly further satisfies to the following conditional formula: EFL/AAG≤4.300, wherein EFL is an effective focal length of the optical lens assembly.

* * * * *